United States Patent
Connell

(10) Patent No.: US 12,181,972 B1
(45) Date of Patent: Dec. 31, 2024

(54) SYSTEM-WIDE CONSTRAINTS ON RETRIES WITHIN DISTRIBUTED APPLICATIONS

(71) Applicant: Amazon Technologies, Inc., Seattle, WA (US)

(72) Inventor: Paul Connell, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 17/934,989

(22) Filed: Sep. 23, 2022

(51) Int. Cl.
*G06F 11/14* (2006.01)
*G06F 11/07* (2006.01)

(52) U.S. Cl.
CPC ...... *G06F 11/1402* (2013.01); *G06F 11/0709* (2013.01); *G06F 11/1443* (2013.01); *G06F 11/1474* (2013.01); *G06F 2201/805* (2013.01)

(58) Field of Classification Search
CPC ............. G06F 11/1402; G06F 11/0709; G06F 11/1443; G06F 11/1474; G06F 2201/805
See application file for complete search history.

(56) References Cited

U.S. PATENT DOCUMENTS

| | | | |
|---|---|---|---|
| 6,851,004 B2 | 2/2005 | Keller et al. | |
| 7,774,780 B2 | 8/2010 | Chow et al. | |
| 8,732,719 B2 | 5/2014 | Kasten et al. | |
| 8,806,490 B1 * | 8/2014 | Pulsipher | G06Q 10/10 718/100 |
| 9,400,657 B2 * | 7/2016 | Busaba | G06F 9/3004 |
| 10,230,600 B2 | 3/2019 | Bhasin et al. | |
| 10,866,862 B2 * | 12/2020 | Li | G06F 11/1402 |
| 10,992,517 B1 * | 4/2021 | Watson | H04L 41/0668 |
| 11,360,804 B2 * | 6/2022 | Sui | G06F 9/5083 |
| 11,429,435 B1 * | 8/2022 | Watson | G06F 9/5038 |
| 11,563,636 B1 * | 1/2023 | Kairali | H04L 67/562 |
| 2010/0138841 A1 * | 6/2010 | Dice | G06F 9/466 718/107 |
| 2020/0351392 A1 * | 11/2020 | Bomma | H04L 67/60 |
| 2022/0229742 A1 * | 7/2022 | Jain | G06F 11/0709 |

* cited by examiner

*Primary Examiner* — Bryce P Bonzo
*Assistant Examiner* — Michael Xu
(74) *Attorney, Agent, or Firm* — Robert C. Kowert; Kowert, Hood, Munyon, Rankin & Goetzel, P.C.

(57) ABSTRACT

It is determined that a workflow comprising inter-resource requests of a distributed application is to be initiated. In response to detecting, at a first resource during execution of the workflow, that a triggering condition for retrying a request is met, and that a workflow-level retry budget of the workflow indicates that a retry is permitted, the retry is attempted and the budget is modified to indicate that the retry has been attempted. In response to detecting, at another resource, that a triggering condition for retrying another request is met, and that the workflow-level retry budget of the workflow indicates that a retry is not permitted, an indication that the workflow has failed is generated.

20 Claims, 12 Drawing Sheets

SYSTEM-WIDE CONSTRAINTS ON RETRIES WITHIN DISTRIBUTED APPLICATIONS

BACKGROUND

Large distributed applications are often implemented as a collection of smaller-scale services. The services which collectively form the larger application typically each present a set of application programming interfaces (APIs) that can be invoked from other services to achieve the overall functionality of the application. This approach, referred to as service-oriented architecture, has many benefits such as enabling small agile teams of software engineers to focus on enhancing features of the individual services constituting the application, making updates more manageable, reducing the risks and impacts of failures, making debugging easier, and so on.

In applications implementing service oriented architectures, software engineers responsible for designing and developing the lower-level services of the application often use retry strategies to try to make forward progress when communicating with resources such as other lower-level services or infrastructure components such as databases. Such resources, or the network between the resources, can suffer brief transient disruptions; this enhances the appeal of using retries instead of a "fail fast" policy which could result in more frequent negative end-user experiences. Unfortunately, in some cases, retry storms or congestion collapse scenarios can occur in distributed applications relying on retries, in which so many retries are attempted by different components of the application in quick succession that the system becomes overwhelmed.

Figure 1:
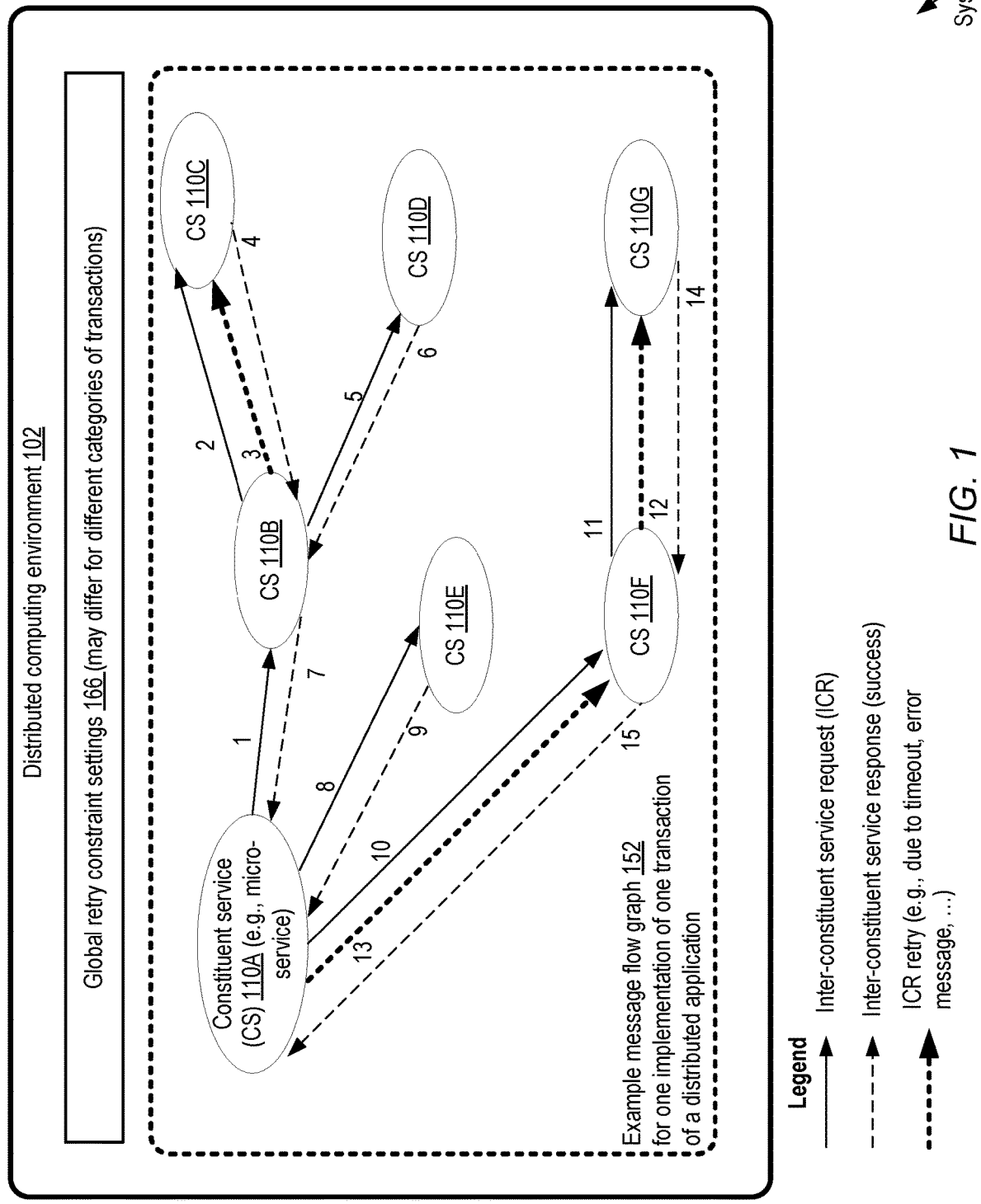
FIG. 1 illustrates an example system environment in which global or transaction-wide constraints on retries may be applied to distributed applications implemented using service-oriented architectures, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for applying system-wide constraints on the number of retry attempts for inter-resource requests that are attempted for a given workflow or transaction implemented at a distributed application which employs a service-oriented architecture (SOA). The overall business logic of many large scale SOA applications can be implemented using a combination of numerous lower-level resources accessible to one another over network connections. The lower-level resources can include services that each implement a part of the business logic, and common infrastructure components such as database management systems, file systems, and the like that may be accessed from or used by the services. Note that a distributed application itself may be accessible to its clients via a network and its own APIs in at least some embodiments, and may thus be considered a service as well. To distinguish the distributed applications from the lower-level services that work together to implement the overall logic of the distributed applications, the lower-level services that constitute or form a distributed application are referred to as constituent services of the distributed application herein.

At least a subset of the resources that collectively implement the business logic of a distributed application may send inter-resource requests via a network to other resources, using APIs or other programmatic interfaces, as part of a given transaction or workflow initiated on behalf of a client of the distributed application. Note that the terms "transaction" and "workflow" are used interchangeably herein to refer to the set of operations performed at a distributed application to satisfy or fulfill a request from a client of the distributed application. After issuing or submitting an inter-resource request, the resource which issues the request may typically wait to receive a corresponding response (although in some cases, multiple inter-resource requests may be issued before receiving a response to a given inter-resource request).

A graph whose nodes comprise individual resources, and whose edges represent inter-resource requests such as API or remote procedure call invocations, can be used to model the interactions required to complete the work corresponding to a given transaction. Such graphs can become quite complex, and may include hundreds or even thousands of nodes and edges, depending on the nature of the distributed application and the granularity at which the business logic is divided among the constituent services and infrastructure components. Transient problems (such as delays caused by temporary network congestion) may sometimes arise in the network pathways between the resources, or at some of the targeted resources themselves. Such problems can usually be resolved fairly quickly, either because the causes of the problems dissipate by themselves or because of efficient built-in recovery mechanisms. From the perspective of the designers of the constituent services and/or infrastructure components, one of the preferred approaches to dealing with such kinds of problems is to simply retry or re-issue inter-resource requests, under the (usually reasonable) assumption that by the time the re-sent resource request reaches the portion of the overall system (i.e., the network path element or the targeted resource) at which a problem apparently occurred, the problem is likely to have been resolved. If the application were instead designed to simply abandon or abort a given transaction as soon as a problem is detected with respect to any inter-resource request, this could result in unnecessarily frequent negative end-user experiences (such as transaction failures, even though the requested work could probably have been completed if the inter-resource request had been retried).

Depending on various factors such as the number of services or infrastructure components involved in a given transaction or workflow graph, and the algorithms used to decide under what circumstances retries should be attempted, in some cases a cascade of retries referred to as a retry storm can occur, which can in effect render the distributed application unable to respond successfully to client requests for at least some time due to retry-related network congestion and/or retry-related overutilization of resources. Retry storms that render the distributed application unusable can be referred to as congestion collapse scenarios. In particular, the probability of retry storms can increase in scenarios in which (a) the total number of resources involved in a transaction or workflow is high and (b) individual resources are permitted to make decisions about attempting retries locally, such that the individual resources are unaware of the amount of retry-related activity that is already underway (or has already been completed) for the transaction or workflow.

In order to reduce the likelihood of problematic scenarios such as retry storms, in various embodiments a more global or system-wide approach to retry management may be employed. According to one such embodiment, when a determination is made that a particular transaction or workflow which is to include numerous inter-resource requests (e.g., requests from one constituent service to another, or requests from a constituent service to an infrastructure element such as a database) is to be initiated at the request of a particular client of a distributed application, a global retry constraint which is to be applied to the transaction as a whole (i.e., considering the entire transaction as a single entity or unit with respect to retries) may be determined. Such a constraint may for example indicate an upper limit on the total number of retries of inter-resource requests which can be attempted during the transaction, regardless of the specific resources (if any) which end up attempting the retries. Constraints of this type may also be referred to as transaction-level or workflow-level retry budgets, as they apply collectively to an entire transaction or an entire workflow, and not to individual resources independently of the constraints which might or might not apply to other individual resources. Consider a trivial transaction T1 whose successful completion requires three inter-resource requests: request R1 from a constituent service S1 to another constituent service S2, request R2 from S2 to another constituent service S3, and request R3 from S3 to another constituent service S4. Assume that the upper limit on retries for T1 is set to six, e.g., by the owner of the distributed application at which T1 is being implemented. This global or transaction-level constraint means that the Services S1, S2 and S3 can collectively make no more than six retry attempts, whether the retries are issued for R1, R2 or R3 requests. As long as all three requests R1, R2 and R3 can be successfully fulfilled without exceeding the total of six retries, T1 can be completed successfully as well. For example, if there are zero retries needed for R1, two retries needed for R2, and four retries needed for R3, this would be acceptable as the total does not exceed six; similarly, if five retries were needed to successfully complete R1, R2 required no retries, and R3 required no retries, this would also be acceptable. If the total number of retries reaches six, the detection of any further retry-causing condition would result in a failure or abandonment of T1 in this example scenario.

A number of different approaches may be employed in different embodiments for implementing the transaction-level or workflow-level constraints on retries. In some embodiments, for example, one or more token buckets (logical data structures comprising some number of tokens each) may be used to store and convey the dynamically changing retry-related configuration settings for a given transaction. In one straightforward implementation, when the transaction is started, the token population of such a bucket may be set to the upper limit on the number of retries, and one token may be consumed each time a retry is attempted by any of the resources used for the transaction. When a given resource detects that a condition for attempting a retry of an inter-resource request has been met (e.g., if no response has been received for the inter-resource request, or an error message has been received), the token bucket's current population may be checked. If the token bucket contains at least one token, the count of tokens in the bucket may be decremented and the retry may be attempted. If the token bucket is empty, in at least some embodiments an indication that the transaction has failed may be generated and provided to the requester of the transaction, without retrying the inter-resource request. More complex techniques for handling different classes of inter-resource requests may be used in some embodiments; for certain types of transactions or resources, a retry manager component of the system which is separate from the constituent resources of the application may be used to manage retry configuration settings. Various parameters governing the system-wide or transaction-level limits on retries, such as parameters defining the conditions which are to trigger retry requests, and/or the actual limits on the number of retries permitted by various resources, may be obtained via programmatic interfaces from the owner or designer of the distributed application in some embodiments. In one embodiment, a software development kit (SDK) or library which implements transaction-level retry management techniques of the kind introduced above may be made available by an operator of a cloud provider network, e.g., as part of a software development service of the cloud provider network, and such an SDK or library may be utilized by clients of the provider network for their own SOA applications. In some embodiments, the techniques introduced herein for retry management may be employed for distributed applications in which at least some inter-resource requests are not sent over a network. Some resources or constituent services of such a distributed application may be implemented in such a way (e.g., at a server that can support many different constituent services and local inter-service communication conduits) that a network is not required for their inter-resource requests. Even though a network path does not have to be traversed for at least some of the inter-resource requests, there may nevertheless be non-negligible costs associated with retries in such embodiments, so it may still be beneficial to limit the total number of retries using transaction-level constraints.

As one skilled in the art will appreciate in light of this disclosure, certain embodiments may be capable of achieving various advantages, including some or all of the following: (a) improving the robustness and availability of large-scale applications which implement service-oriented architectures, e.g., by reducing the probability of application-level disruptions caused by excessive retries of inter-resource requests over network pathways, and/or (b) enabling software designers to choose customized retry-related parameters for different constituent services of a distributed application, based for example on analysis of metrics collected over time with regard to transient failures and errors, thereby reducing the overall amount of computing and/or networking resource used for the applications.

According to some embodiments, a system may include one or more computing devices. The one or more computing devices may include instructions that upon execution on or across the one or more computing devices determine that a transaction comprising a plurality of inter-service requests is to be initiated in response to a client request directed to a distributed application implemented using a service-oriented architecture. Individual inter-service requests may be sent via a network from one constituent service of a plurality of constituent services of the distributed application to another constituent service of the plurality of constituent services. A global retry constraint to be applied to the transaction, which indicates an upper limit on the number of retries of inter-service requests that can be attempted to complete the transaction, may be determined in various embodiments, e.g., prior to the initiation of the operations of the transaction. A population of tokens of a retry token bucket associated with the transaction may be set to an initial value based at least in part on the upper limit in some embodiments.

A first constituent service of the application may determine or detect, during execution of the transaction in various embodiments, that (a) a first triggering condition for retrying a first inter-service request directed to a second constituent service from the first constituent service has been satisfied and (b) the population of tokens of the retry token bucket exceeds a first threshold. The first constituent service may then cause the population of tokens of the retry token bucket to be reduced by a first amount, and retry or re-issue the first inter-service request.

The second constituent service may determine or detect, during execution of the transaction in various embodiments, that (a) a second triggering condition for retrying a second inter-service request directed to a third constituent service from the second constituent service has been satisfied and (b) the population of tokens of the retry token bucket does not exceed the first threshold. In such a scenario, the second constituent service may cause an indication that the workflow has failed to complete to be generated, without retrying the second inter-service request. The transaction may thus be abandoned due to the lack of sufficient tokens for a needed retry attempt in such cases.

In some embodiments, the inter-service requests may be transmitted using messages formatted according to HTTP, or a variant of an HTTP protocol. Configuration settings related to retry constraints may be included in an HTTP header in one such embodiments. For example, the current number of tokens available in a token bucket representing the transaction-level limit on retry attempts may be indicated in an HTTP header of a message comprising an inter-service request sent from one service used in the transaction to another service used on the transaction. The receiving service, responsible for sending the response to the inter-service request, may in turn include the current token bucket population (which may have been reduced if some number of retries were used by the receiving service or by other services invoked by the receiving service) in an HTTP header of the response to the inter-service request.

In some embodiments, instead of or in addition to providing information about retry-related configuration in the messages sent from one constituent service or resource to another, a separate retries manager (implemented using one or more computing devices that are not used for executing the logic of the constituent services or resources) may be used for conveying the retry-related configuration information for various transactions to the application components implementing the transaction. For example, to decrement the token count associated with a given transaction, the resource which attempts a retry may communicate with the retries manager. In some embodiments, one or more parameters governing the use of retries may be specified via programmatic interfaces of a system used for implementing the distributed application—e.g., the global retry constraint applicable to one or more types of transactions may be received via such interfaces, the definitions or descriptors indicating the triggering conditions which lead to retry attempts may be specified via such interfaces, and so on. In some embodiments the distributed application may comprise one or more request handlers, transaction coordinators or workflow initiators that receive requests from clients and initiate the execution of corresponding transactions or workflows; such request handlers, transaction coordinators or workflow initiators may receive retry parameters as well and cause the parameters to be applied for the client-requested transactions.

As indicated earlier, a given distributed application may be implemented using a set of lower-level services as well as infrastructure components such as databases and the like in some embodiments. The term "resource" may be used herein to refer collectively to such lower-level or constituent services as well as the infrastructure components. Inter-resource requests that are used to perform a given transaction or workflow initiated on behalf of a client of the distributed application may in general be sent from one constituent service to another constituent service, from one constituent service to an infrastructure component, from one infrastructure component to another infrastructure component, or from one infrastructure component to a constituent service of the application. Constraints or limits on retries may be applied to a combination of any of these types of inter-resource request types in different embodiments. In some embodiments, the constraints may be expressed in terms of the number of retries; in other embodiments, the constraints may be expressed in terms of other units, such as the number of bytes sent over a network for retries, the total amount of time spent waiting for retries, and so on. The constraints may be referred to as transaction-level retry budgets, workflow-level retry budgets, transaction-level retry configuration settings or workflow-level retry configuration settings in different embodiments. In various embodiments, upon determining that a triggering condition for retrying an inter-resource request issued from a given resource has been satisfied, the issuing resource may be required to verify that the current retry budgets or configuration settings permit the issuing resource to retry the inter-resource request being considered, before attempting the inter-resource request.

In various embodiments, at least a subset of transaction-level retry configuration settings of a given transaction may be modifiable directly or indirectly by at least some of the resources involved in performing the operations of the transaction. For example, in embodiments in which a token bucket is used, some or all of the resources involved in a transaction may be permitted to reduce the count of tokens in the bucket (e.g., if a retry is attempted by the resource), but may not be permitted to increase the count of tokens in the bucket. Whenever an inter-resource request is retried, the current version of the retry configuration settings or retry budget may be modified to indicate that the retry has been attempted in various embodiments. In at least some embodiments, log records may be generated and stored whenever the retry configuration settings/budgets are modified for a given transaction, e.g., if/when tokens are consumed from a token bucket. In some implementations, the log records may be immutable, so that it becomes possible to easily track all changes to retry-related configuration settings associated with various transactions. In one embodiment, log records associated with retry constraints (such as records indicating consumption of tokens) may be examined and evaluated, e.g., together with other log records representing actual retry attempts, to verify that the resources involved in the transactions are complying with the retry constraint mechanisms that are intended to be in effect. If a resource such as a constituent service is found to be non-compliant, e.g., if a retry was attempted without reducing the token count in the applicable bucket, a request may be sent programmatically to the owner/designer of the service to make changes so that such violations of the retry constraint mechanisms do not recur.

Any of a variety of triggering conditions may lead to retry attempts for inter-resource requests in different embodiments. For example, such a triggering condition may be satisfied if a timeout associated with an inter-resource request expires (indicating that the response to the request has not been received within a time period in which it was expected), if an error message (such as "resource unavailable" or "resource unreachable") pertaining to the request is received, and so on. In some embodiments, designers of the distributed application and/or of individual components or resources involved in the application may provide the definitions or descriptions of the triggering conditions via programmatic interfaces.

In some embodiments in which token buckets are used as the mechanism for enforcing retry limits, different token buckets may be used for respective subsets of the resources which collectively implement a transaction. For example, token bucket TB1 with an initial token count TC1 may be used for retries directed to a first set of resources {R1, R3, R4} used in the transaction, while token bucket TB2 with an initial token count TC2 may be used for retries directed to a second set of resources {R2, R5} used in the transaction. If a condition for attempting a retry of a request directed to R2 is satisfied, and no tokens are available in TB2, the retry may be forbidden even if there are tokens available in TB1 in this example. Similar approaches which distinguish the retry constraints for respective classes of services used in a transaction may be employed in embodiments in which mechanisms other than tokens are used.

In one embodiment in which token buckets are used as the mechanism for enforcing retry limits, different token buckets may be used depending on the number of retries which have been attempted earlier for the same inter-resource request. For example, a token bucket TB1 may be used for first-time retry attempts, another token bucket TB2 may be used for second-time retry attempts, and so on. The first time a condition for issuing a retry is satisfied with respect to a request from a resource R1 to another resource R2, the population if TB1 may be checked to see whether that retry can be issued. If a condition for retrying again for the request from R1 to R2 is reached (e.g., if the first retry fails) TB2 may be checked to determine whether the second retry can be attempted or not in this example. Such repeat-retry-count based approaches may for example be used in scenarios in which the likelihood of repeated attempts to satisfy a given request is assumed to be reduced as the number of repeated attempts increases, so not all the retry attempts are assumed to have the same probability of success. Similar approaches which distinguish the retry constraints for respective repeat counts or ordinal counts of inter-resource requests may be employed in embodiments in which mechanisms other than tokens are used.

A number of metrics pertaining to the retry behaviors of different subcomponents of a distributed application may be collected in some embodiments, and provided (e.g., to application owners or owners of constituent resources of the application) via programmatic interfaces in some embodiments. Such metrics may include, among others, the total number of retries attempted during one or more executions of a workflow or transaction, a respective count of retries attempted by individual resources of the plurality of resources which collectively perform a transaction or workflow, or statistics on the different kinds of triggering conditions which led to initiation of retries during the transactions or workflows of the application in one embodiment.

In some embodiments, system-wide constraints on retries, enforced using techniques such as those introduces above, may be combined with other strategies designed to make distributed applications more resilient. For example, retry back-off algorithms (in which longer delays are introduced between successive retries as the number of retries attempted for a given inter-resource request increases), throttling (preventing the numbers of concurrent transactions from exceeding thresholds) and/or transaction deadlines (whereby a given transaction is abandoned if the time that has elapsed since the transaction began exceeds a threshold, instead of attempting additional retries) may be used together with token buckets representing transaction-level limits on retries.

In some embodiments, retry constraint management techniques similar to those introduced above may be implemented for distributed applications implemented at least in part using resources of a cloud provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load of the distributed applications, for example. Cloud computing can thus be considered as both the applications delivered as services over a publicly accessible network (e.g., the Internet or a cellular communication network) and the hardware and software in cloud provider data centers that provide those services. In some embodiments, a distributed application may for example use virtualized computing resources (e.g., virtual machines or compute instances) of a computing service of a provider network, database instances implemented at a database management service of the provider network, file system instances implemented at a file system management service of the provider network, and so on. In some embodiments, a provider network may include a retry management service which can be used to enforce and verify constraints on retries attempted during implementation of applications that are also implemented at the provider network. Such a retry management service may for example implement programmatic interfaces which can be used by application designers or application owners to specify retry-limiting parameters, to view log records and metrics pertaining to retry constraints, and so on.

FIG. 1 illustrates an example system environment in which global or transaction-wide constraints on retries may be applied to distributed applications implemented using service-oriented architectures, according to at least some embodiments. As shown, system 100 includes a distributed computing environment 102 at which a variety of applications designed according a service-oriented architecture may be implemented, and global retry constraint settings 166 may be enforced. Each of the SOA applications may provide support for one or more categories of transactions, with a given instance or example of a transaction category being implemented using several smaller-scale services, referred to as constituent services of the application. Individual ones of the constituent services may comprise software running at one or more computing devices, designed by constituent service-specific teams of engineers in some cases. To accomplish the work required for a transaction or workflow initiated to satisfy a given request from a client of the distributed application, a number of requests may be sent over network paths between constituent services of the application. Each category of transaction may be modeled as a graph whose nodes represent the constituent services involved in performing the transaction, and whose edges represent inter-service requests. Depending on whether the inter-service requests succeed on the first attempt, or have to be retried one or more times, different numbers of messages may be sent during respective executions of a transaction of a particular category. Global retry constraint settings 166 may differ from one category of transaction to another in at least some embodiments.

An example message flow graph 152, representing the transmission of messages during one specific implementation of one specific transaction corresponding to a particular transaction category supported at a distributed application is shown in FIG. 1. The distributed application utilizes seven constituent services (CSs) 110, including CS 110A, CS 110B, CS 110C, CS 110D, CS 110E, CS 110F and CS 110G in the depicted embodiment. During an execution of a successfully concluded transaction of the particular transaction type, the following inter-service requests (also referred to as inter-resource requests) may be sent among pairs of CSs. CS 110A may send a request to CS 110B. CS 110B may send one request to CS 110C and one request to CS 110D. CS 110A may send a request to CS 110E and then another request to CS 110F, and CS 110F may send a request to CS 110G. For each such inter-constituent service request (ICR), the requesting service may expect a response from the targeted service to which the request was sent. If, instead of a response indicating that the requested operations have been completed, an error message is received, or if no response is received during some chosen timeout interval, the requesting service may in general issue a retry for the original request; additional retries may be attempted if the first retry does not succeed, the second retry does not succeed, and so on.

In the embodiment depicted in FIG. 1, in order for example to avoid certain kinds of problematic scenarios in which the constituent services or their inter-service networks can become overloaded due to the issuance of too many retried requests, respective global retry constraint settings may be selected for one or more classes of transactions. The retry constraint settings may in effect limit or control the number of ICR retries that can be attempted during a given execution of a transaction, by any and all of the CSs involved in executing the transaction, before the transaction has to be abandoned (if the limit is reached). The retry constraint settings may thus apply to a transaction as a whole (hence the use of the terms "global", "transaction-level" or "workflow-level" when referring to the constraint settings), and not to individual CSs in the depicted embodiment. As such, before issuing a retry, a given CS involved in execution of a transaction may implicitly take retries attempted by other CSs of the transaction into consideration, and the given CS may not make a decision to retry an ICS independently of the retry decisions that have already been made by other CSs (or by itself) earlier during the execution of the transaction. For example, if the constraints indicate that the total number of retries during the execution of a given transaction that can be attempted is not to exceed ten, each of the CSs used for the execution may be informed about the remaining number of retries that can be attempted as the transaction proceeds, and a retry may only be attempted if the total number of retries that has already been attempted does not exceed nine.

In the message flow graph 152, as indicated by the legend shown below the graph, messages labeled 1, 2, 5, 8, 10 and 11 represent inter-constituent service requests. Success response messages (i.e., messages indicating that the work indicated in an ICR has been successfully completed) include those labeled 4, 6, 7, 9, 14 and 15. In some cases, the success responses are generated after the corresponding ICR is retried, while in other cases no retries are required before the success response is generated. Success responses 6, 7, and 9 did not require retries to be attempted in the depicted scenario. However, after sending the ICR 2, CS 110B detected a triggering condition (such as expiration of a timeout, or an error message) for retrying the ICR; consequently, an ICR retry labeled 3 was sent, and the success response labeled 4 was sent in response to the retry. Prior to sending the retry request 3, CS 110B may have determined that the global retry constraint applicable to the current transaction execution permits the sending of an additional retry in the depicted embodiment. Similarly, after sending the ICR 11, CS 110F may have detected a triggering condition for retrying the ICR; consequently, an ICR retry labeled 12 was sent, and the success response labeled 14 was sent in response to the retry. Prior to sending the retry 12, CS 110F may also have determined that the global retry constraint applicable to the current transaction execution permits the sending of an additional retry. After sending the ICR 10, CS 110A detected a triggering condition for retrying the ICR; consequently, an ICR retry labeled 13 was sent, and the success response labeled 15 was sent in response to the retry. Prior to sending the retry 13, CS 110A may also have determined that the global retry constraint applicable to the current transaction execution permits the sending of an additional retry. If, when checking the global constraint, a given CS determines that additional retries for the current transaction are not permitted, in various embodiments an indication that the transaction has failed may be generated, without actually issuing the retry.

In some embodiments, the global configuration settings pertaining to retry constraints may include at least one token bucket (i.e., a data structure representing a collection of tokens), with the initial population of tokens of the bucket set (at the time the transaction starts) to the upper limit on the number of retries that can be attempted during the course of the entire transaction. If a token bucket were being used in the scenario depicted in FIG. 1, for example, and the total number of retries that could be attempted during the transaction was selected as three, a total of three tokens may be stored in the transaction-level token bucket prior to the issuance of ICR 1 by CS 110A to CS 110B. One token may be consumed from the token bucket each time a retry is attempted in one embodiment. In at least some embodiments, the current token population (and hence the current retry budget) may be indicated in at least some ICRs, in the corresponding responses, and/or in the retry attempts. For example, ICR 1 may indicate a token count of 3 available tokens. ICR 2 may also indicate a token count of 3 (as no retries have been attempted). After checking that the bucket contains at least one token, the token count may be decremented to 2, and retry 3 may indicate an available token count of 2. Since CS 110C does not retry any requests itself, the response 4 may also indicate a token count of 2. Similarly, request 5 may indicate a token count of 2, response 6 may indicate a token count of 2, request 8 may indicate a token count of 2, response 9 may indicate a token count of 2, request 10 may indicate a token count of 2, request 11 may indicate a token count of 2, retry 12 may indicate a token count of 1, response 14 may indicate a token count of 1, retry 13 may indicate a token count of 0, and response 15 may indicate a token count of 0 in the depicted example. After issuing retry 13, if CS 110A were to detect that conditions for another retry have been satisfied, the fact that the bucket has zero tokens available may cause the transaction to be failed in the depicted example scenario.

Note that token buckets, in which whole tokens are required to issue a retry, represent just one implementation mechanism for transaction-level or global retry constraints. In some embodiments, other mechanisms may be used—for example, fractions of tokens may be used, measurements or estimates of time (e.g., how much time has been consumed waiting for retry responses thus far in the transaction, or for the transaction as a whole) or network bandwidth (e.g., how much network bandwidth has been used for retries or the transaction as a whole) may be used, and so on. In various embodiments, applying such transaction-level constraints, also referred to as workflow-level constraints, may help avoid rapid cascades of retry attempts of the kind illustrated below in the context of FIG. 2, and may thus lead to enhanced robustness and availability of distributed applications.

Figure 2:
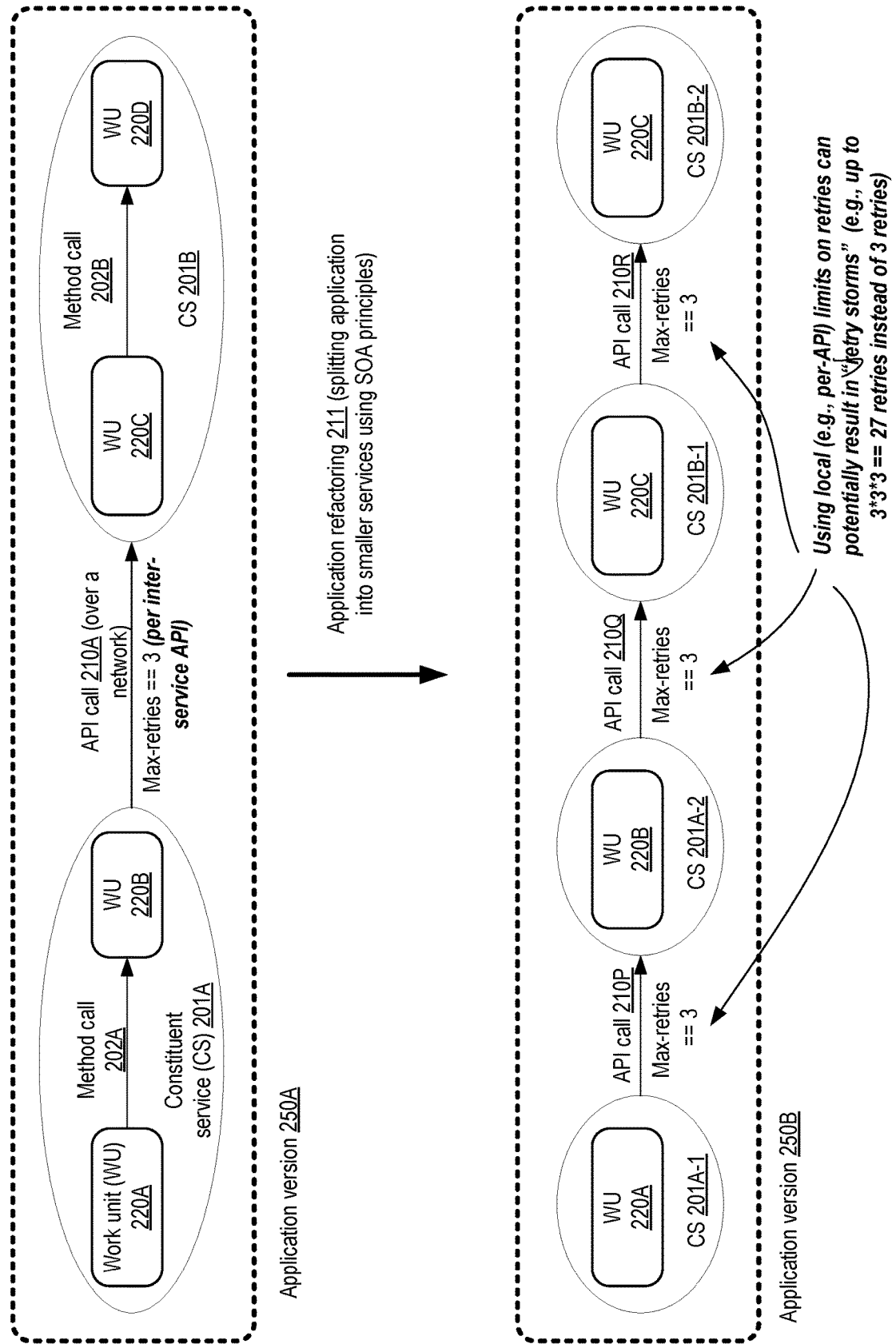
FIG. 2 illustrates an example scenario in which the total number of retries which may be attempted within a given application which does not utilize global retry constraints increases rapidly as the number of constituent services of the application is increased, according to at least some embodiments.

FIG. 2 illustrates an example scenario in which the total number of retries which may be attempted within a given application which does not utilize global retry constraints increases rapidly as the number of constituent services of the application is increased, according to at least some embodiments. A trivially simple scenario is shown in FIG. 2 to highlight the concepts involved. Initially, a particular application may be designed as shown in application version 250A, comprising two constituent services CS 201A and CS 201B. Within a given constituent service, work units implemented using respective sets of software may communicate with one another via method calls (also referred to as procedure calls or function calls). For example, within CS 201A, work unit (WU) 220A uses method call 202A to invoke or execute WU 220B, and within CS 201B WU 220C uses method call 202B to execute WU 220D. An API call 210A transmitted over a network is used by CS 201A to invoke the functionality of CS 201B (e.g. WU 220B may issue the API call to cause WU 220C to be executed). In the version 250A, local retry constraints may be employed at the per-API level—e.g., the maximum number of retries permitted for API 210A (max-retries) may be set to 3.

In accordance with the principles of service-oriented architecture, application refactoring 211 may be performed to split the application into smaller services than are used in version 250A, resulting in new version 250B. Each of the WUs which were shown in application version 250A may be implemented in its own constituent service in the depicted example, with method calls now being replaced by API calls transmitted over network paths in the refactored version 250B. For example WU 220A is now part of a smaller service CS 201A-1, WU 220B is now part of CS 201A-2, WU 220C is now part of service CS 201B-1, and WU 220D is now part of CS 201B-2. API call 210P is used to invoke WU 220B, API 210Q is used to invoke WU 220C, and API 210R is used to invoke WU 220C. If the local max-retries setting of 3 is retained for each of the APIs in application version 250B, the total number of retries which may result from a short-term disruption or problem at WU 220C (or in the network between CS 201B-1 and CS 201B-2) may increase substantially. For example, unless a success response is received quickly from CS 201A-2 at CS 201A-1, up to 3 retries may be attempted for API call 210P. For each of those API calls, it may be the case that 3 retries of API call 210Q may have to be attempted; similarly, for each retry of API call 210Q, up to 3 retries of API call 210R may be attempted. Thus, using local (e.g., per-API) limits on retry attempts can potentially result in "retry storms", with the likelihood of such retry storms increasing as the total number of services involved or participating in a transaction increases. In application version 250B, up to 27 (3*3*3) API call retries may be attempted for a single transaction, in contrast to a maximum of 3 such API call retries in application version 250A. Note that because API calls are sent over a network, retrying API calls can in at least some cases be more expensive from a resource perspective than retries of method calls local to a particular server. In modern distributed applications, hundreds or even thousands of API calls may have to be made over a network, so the potential for retry storms when using local constraints on retries can become quite high.

Figure 3:
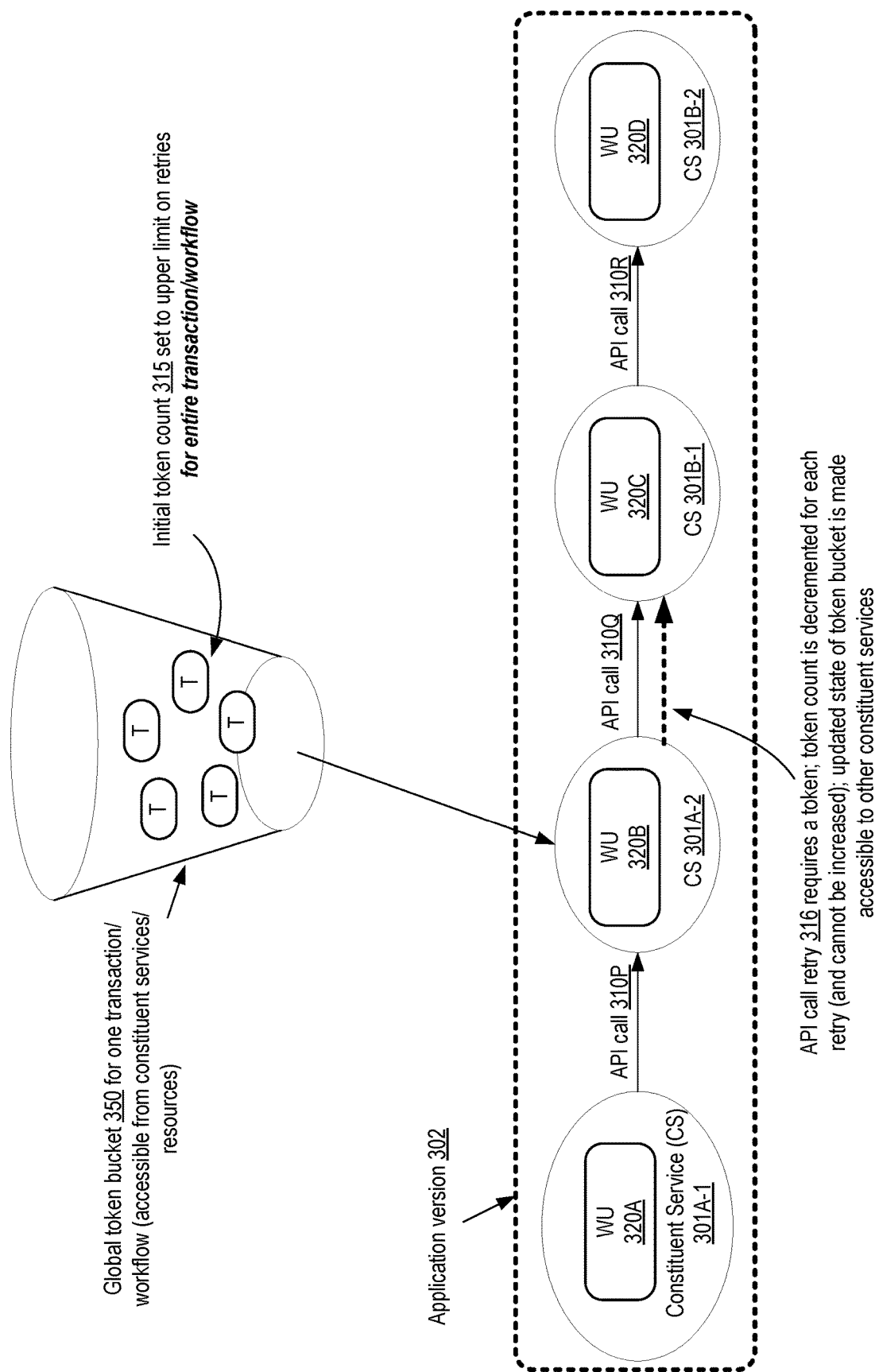
FIG. 3 illustrates an example of the use of a global token bucket to restrict the maximum number of retries attempted within an application, according to at least some embodiments.

In contrast to the local approach to constraining inter-service requests of a distributed application shown in FIG. 2, a global approach may be employed in at least some embodiments. FIG. 3 illustrates an example of the use of a global token bucket to restrict the maximum number of retries attempted within an application, according to at least some embodiments. In the example scenario of FIG. 3, a respective global token bucket 350 (containing retry tokens represented by the ovals containing the letter T) may be set up for each transaction or workflow initiated at a distributed application at the request of various clients. The retry token bucket may be implemented in such a way that it is accessible from at least some of the constituent services that collectively execute the logic of the application. An initial token count 315 may be set to an upper limit on the number of retries that can be attempted for the entire transaction or workflow; as such, the limits may be global or system-wide (with respect to all the resources of the system that are used for the transaction/workflow) rather than local in the depicted scenario.

Version 302 of a distributed application at which the global token bucket is utilized may comprise four constituent services, just as application version 250B shown in FIG. 2 did. WU 320A may be performed within CS 301A-1, WU 320B may be performed within CS 301A-2, WU 320C may be performed within CS 301B-1, and WU 320D may be performed within CS 301B-2. CS 301A-2 may be invoked via API call 310P from CS 301A-1, CS 301B-1 may be invoked via API call 310Q from CS 301A-2, and CS 301B-2 may be invoked via API call 310R from CS 301B-1. If and when a determination is made at a given constituent service that a triggering condition for retrying an API call has been met, the number of tokens remaining in the global token bucket may be determined, and the API call may be retried only if at least one token remains in the bucket. If the API call is retried, one token may be consumed from the bucket in the depicted embodiment. For example if API call 310Q is to be retried, the API call retry 316 requires one token, and the token count may be decremented. In at least some embodiments, the token count may not be increased after the initial token count is set; as such the number of tokens present in the bucket in such embodiments may correspond to a non-decreasing function. The updated or current state of the token bucket may be made available or accessible to the other constituent services involved in the transaction in the depicted embodiment, so that any given retry attempt by any resource used in the transaction is controlled using the same bucket. In one embodiment, the token count for a transaction may be increased under certain conditions after the transaction is underway (i.e., at some point after the initial number of tokens have been placed in the bucket being used for the transaction). For example, if some tokens were used extremely quickly or without significant side effects during execution of a given transaction, an external authority such as a transaction coordinator may add tokens to the token bucket for that transaction in order to increase the probability that one or more downstream constituent services (which have not yet received inter-service requests as part of the transaction) can attempt retries if needed. In various embodiments, even in scenarios in which the token count can be increased under some limited circumstances, the set of tokens in a token bucket may in general be considered exhaustible; once the tokens of the bucket are exhausted, in most cases no more retries may be permitted as part of the corresponding transaction.

Any of a variety of techniques and data structures may be used to implement buckets and tokens in different embodiments. For example, in one simple implementation a token bucket for a given transaction may be implemented simply as a tuple comprising a unique transaction identifier and an integer, with the integer indicating the current number of tokens present in the bucket for the transaction with the unique transaction identifier. In some implementations, tokens may be implemented using cryptographic techniques that ensure that a given token can be utilized or consumed no more than once, thereby preventing constituent services from inadvertently or deliberately re-using tokens. The number of tokens initially assigned to a transaction of a given category may in some embodiments be chosen or tuned based on empirical analysis of the transactions of that category over time. For example, the initial token count for a given transaction type may be set to an arbitrarily selected number N initially; then, the success of that initial token count setting (e.g., using metrics such as the rate of transaction abandonments due to token limits, network bandwidth usage, constituent resource utilization levels, etc.) may be evaluated for some time, and N may be adjusted upwards or downwards if needed. In at least one embodiment, such tuning may be performed automatically, e.g., by tuning managers implemented at one or more computing devices. In some implementations, retry configuration settings comprising token counts may be shared among constituent services using HTTP headers as discussed below; in other embodiments a retries manager distinct from the constituent services may be used to keep track of tokens. In some embodiments, variants of token-based algorithms which take multiple token buckets into account, or in which different counts of tokens are required for different kinds of inter-service requests, may be used. Some of these variants are discussed below in further detail. Note that tokens and token buckets are discussed herein as concepts that can be used to constrain the amount of resources consumed for retries in distributed applications; in practice, other entities (such as an accumulated estimated measure of resources consumed for retries, or an accumulated estimated measure of time consumed for retries) may be used analogously instead.

Figure 4:
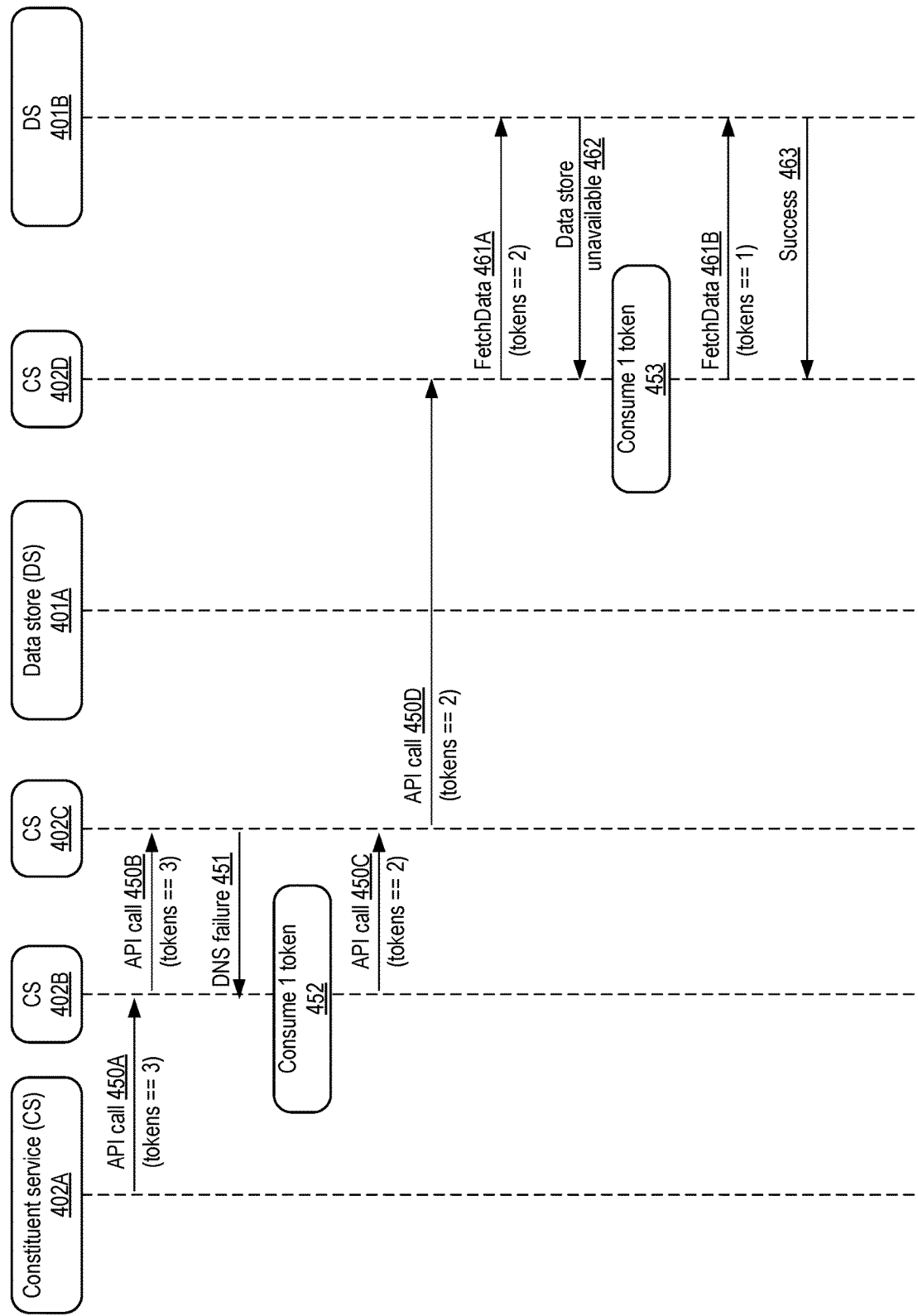
FIG. 4 and FIG. 5 collectively illustrate an example sequence of inter-resource requests associated with a particular transaction at a distributed application in which global constraints are applied to retries, according to at least some embodiments.
Figure 5:
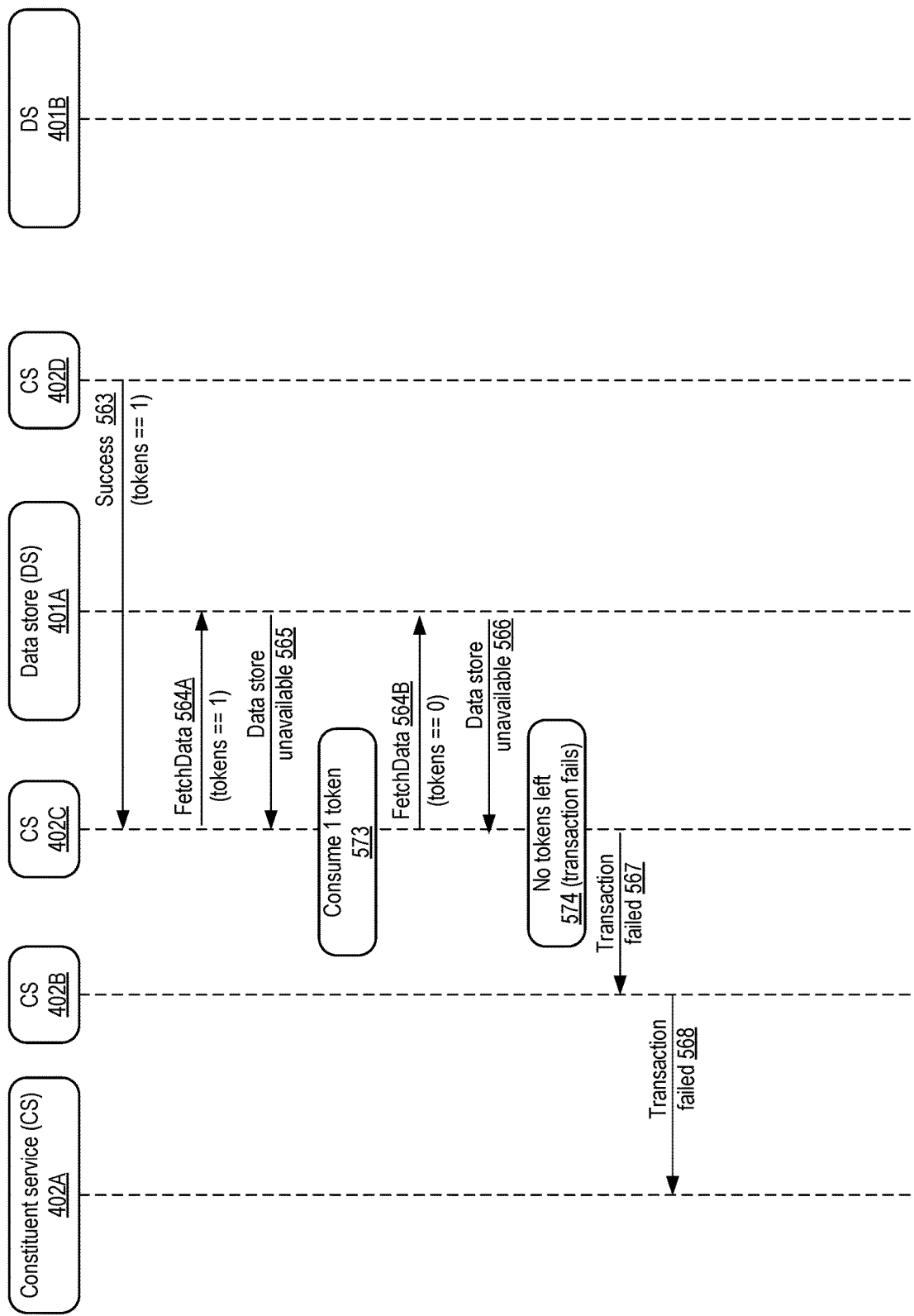

FIG. 4 and FIG. 5 collectively illustrate an example sequence of inter-resource requests associated with a particular transaction at a distributed application in which global constraints are applied to retries, according to at least some embodiments. In the example scenario shown in FIG. 4 and FIG. 5, a transaction implemented at a distributed application may require work to be performed at four constituent services CS 402A, CS 402B, CS 402C, and CS 402D, and also at infrastructure components data store DS 401A and DS 401B. The data stores and the constituent services may all be referred to as resources of the transaction. Several inter-resource requests may have to be fulfilled successfully to complete the work of the transaction. A global token bucket for the transaction may be populated with three tokens initially, indicating that the total number of retries that can be attempted for the transaction as a whole is to be limited to three. Note that some resources involved in the transaction may not necessarily participate actively in the token-based retry management scheme in some scenarios; for example, a data store such as DS 401A may not have been designed or implemented to use tokens in the way that the constituent services use tokens. In such situations, the retry management scheme operations (such as consumption of tokens each time a retry is attempted) may be performed by only some of the resources used for a given transaction. In some embodiments, a common software library that utilizes tokens or logically equivalent retry management mechanisms may be used by several or all of the resources involved in implementing distributed transactions of one or more categories when making retry attempts, so that for example code for consuming tokens may not have to be re-written for all the resources.

CS 402A may issue an API call 450A directed to CS 402B as the first inter-resource request of the transaction in the depicted scenario. For each inter-resource request (and for retries of such requests), the current count of tokens is shown in FIG. 4 and FIG. 5. There are 3 tokens available in the token bucket when the API call 450A is issued. CS 402B in turn issues API call 450B to CS 402C, with the number of tokens remaining still set to 3. A DNS failure 451 occurs with respect to API call 450B, so the API call has to be retried in the example of FIG. 4. One token is consumed, as indicated in 452, and the API call 450C (a retry of API call 450C, resulting from the detection of the DNS failure) is issued, with the current token count equal to 2. In contrast to the original attempt at an API call directed to CS 402C, the retry does not result in an error in the depicted example.

CS 402C may issue an API call 450D to CS 402D, with the token count equal to 2. CS 402D may issue a request to fetch some data (FetchData request 461A) to DS 401B, with the token count remaining at 2. Requests to fetch data from data stores may be considered logically equivalent to API calls, as they may also be transmitted over a network and may also each result in a response message indicating that the requested work has been completed. An error message "data store unavailable" 462 may be received at CS 402D, so the request to fetch data may have to be retried. Another token of the token bucket may be consumed, as indicated in 453, and FetchData 461B may be sent, representing a retry. The remaining token count is now 1. A success message 463 may indicate that the data was fetched successfully from DS 401B. The message flow sequence for the transaction continues in FIG. 5.

At some point after successfully obtaining the requested data from DS 401B, CS 402D may in turn send a success message 563 to CS 402C, indicating that the work requested by CS 402C has been completed in the example scenario. Having received the success message 563, CS 402C may issue its own FetchData request 564A to DS 401A. If the data store cannot be reached for some reason, and a "data store unavailable" message 565 is instead obtained at CS 402C, a retry may be attempted if a token remains available. At the time that the error message 565 is received at CS 402C, there is still one token in the global token bucket for the transaction, so that token may be consumed as shown in 573, and a retry FetchData request 564B may be sent with token bucket population now zero.

If the FetchData request 564B also fails, e.g., with another "data store unavailable" error message 566 being received at CS 402C, CS 402C may determine that no tokens are left as indicated in 574, and the transaction may be considered to or designated as having failed. A "transaction failed" message 567 may be sent to CS 402B from CS 402C (this may represent a response to API call 450C of FIG. 4), and another "transaction failed" message may similarly be sent from CS 402B to CS 402A. In the sequence of interactions illustrated in FIG. 4 and FIG. 5, the current token count in a transaction-level token bucket may be used to determine whether an inter-resource request (regardless of whether the target resource is a constituent service or an infrastructure component such as a data store) can be retried at several times during the source of the attempt to execute the transaction. Tokens may be consumed whenever a retry is attempted, so the population of the token bucket never increases after the token bucket is initialized at the start of the transaction. The current population of the token bucket is provided to at least some of the resources involved in executing the transaction, e.g., in inter-resource requests as well as response messages corresponding to the inter-resource requests. If the token bucket becomes empty and a triggering condition for requesting a retry of an inter-resource request is satisfied subsequently by some resource, the transaction is designated as a failed transaction. Note that while in the scenario depicted in FIG. 4 and FIG. 5, tokens are deducted from the token bucket prior to issuing a retry, in some embodiments tokens may be deducted after the retry is issued, or concurrently with the issuance of the retry.

Figure 6:
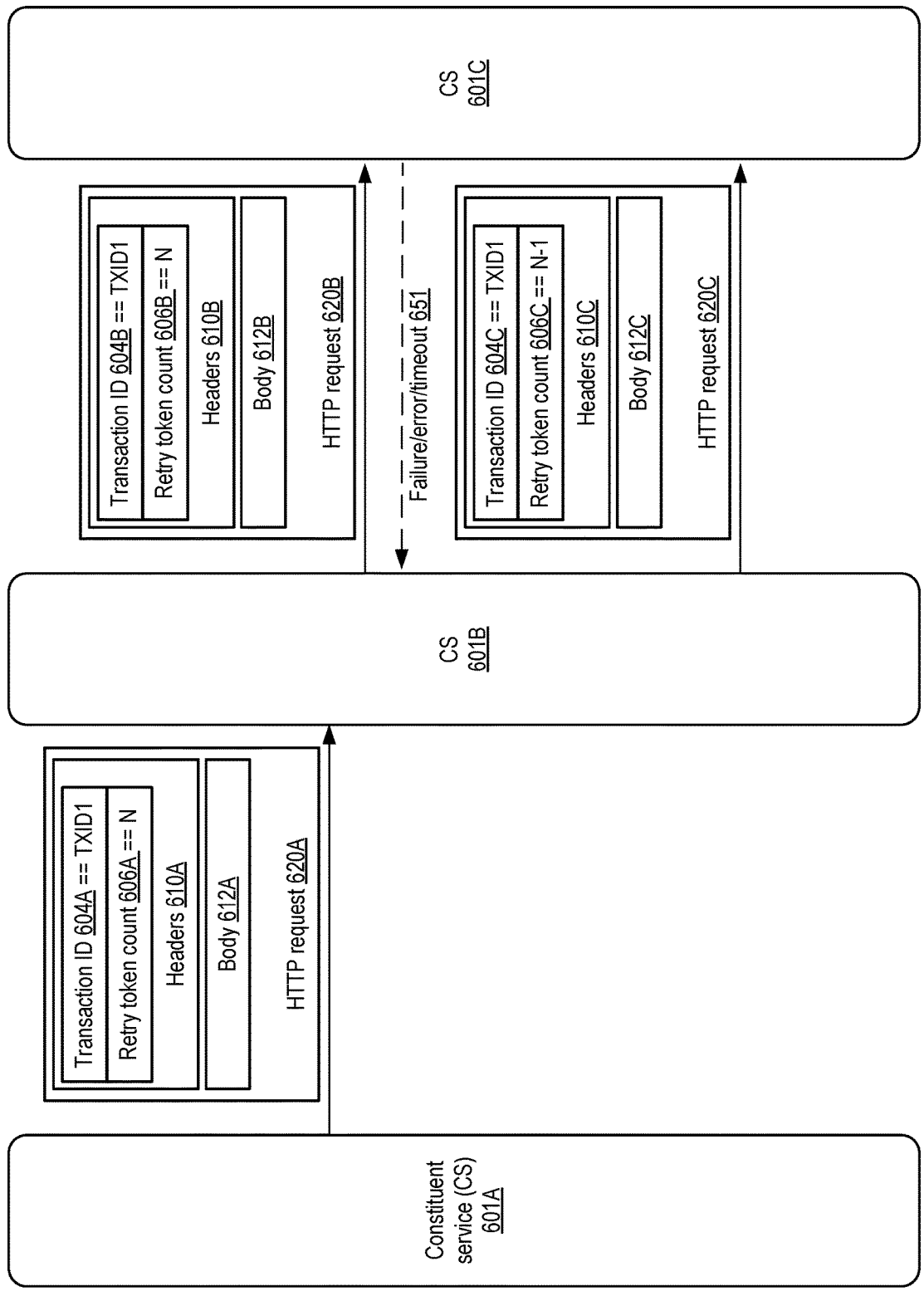
FIG. 6 and FIG. 7 collectively illustrate an example scenario in which HTTP (HyperText Transfer Protocol) headers may be employed for conveying information about retry attempts, according to at least some embodiments.
Figure 7:
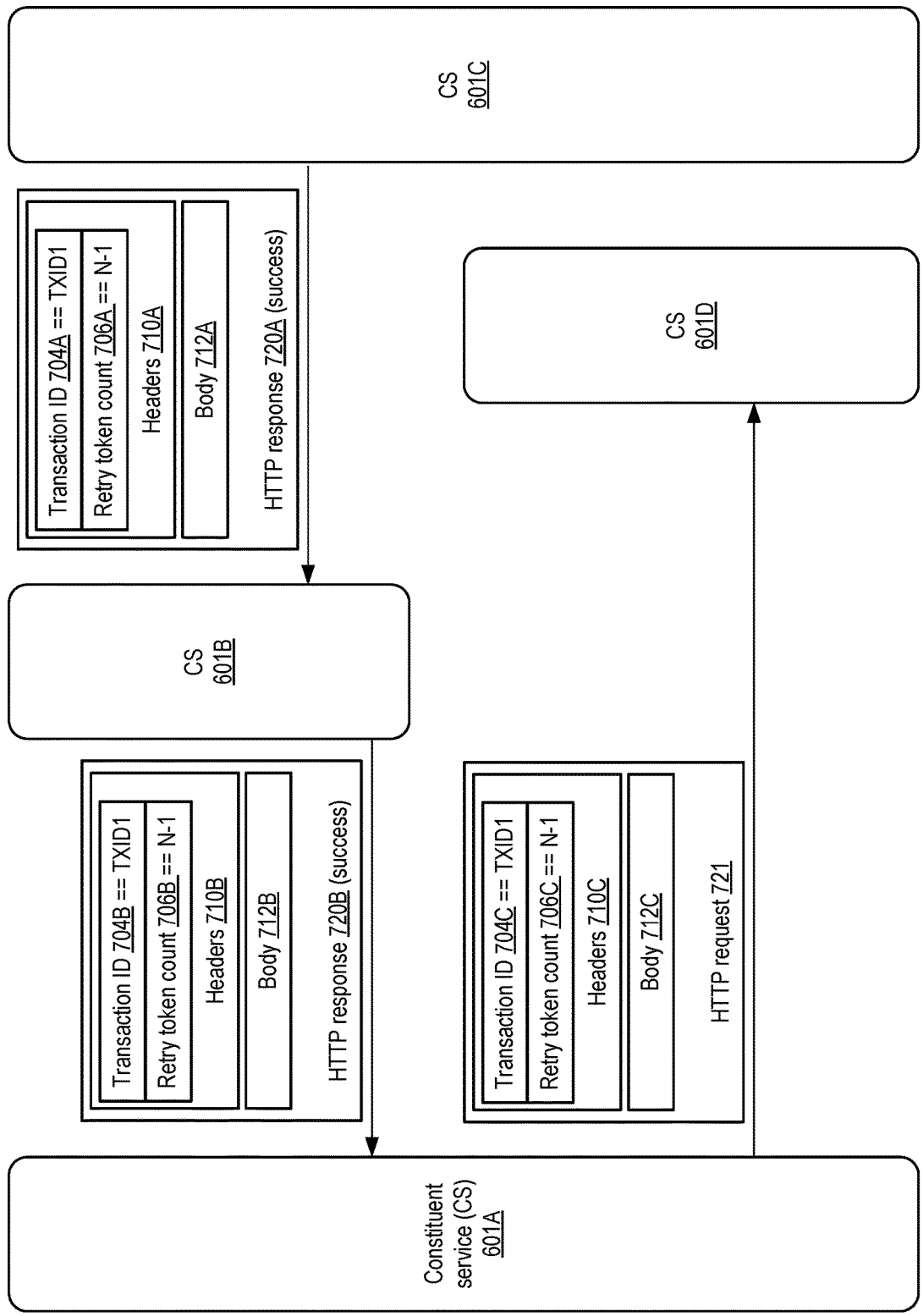

As mentioned earlier, several approaches may be taken towards representing and sharing retry configuration settings/parameters such as token buckets in different embodiments. FIG. 6 and FIG. 7 collectively illustrate an example scenario in which HTTP headers may be employed for conveying information about retry attempts, according to at least some embodiments. In the embodiment depicted in FIG. 6 and FIG. 7, constituent services of a distributed application may send requests to one another using HTTP messages, and may also receive corresponding responses via HTTP messages.

As part of execution of a particular transaction, constituent service CS 601A sends an HTTP request 620A, comprising an inter-resource request to another constituent service CS 601B. The HTTP request 620A includes headers 610A and a body 612A. In at least some embodiments, the body of an HTTP message may contain data indicative of the tasks that are being requested (or the results of the tasks, in the case of responses to the requests), while the headers may include retry related metadata as well as additional metadata in some cases. For example, the transaction identifier (ID) 604A of the particular transaction being executed may be set to a unique ID (such as TXIDI) and included in an HTTP header. The retry token count 606A, which may initially be set to some value N for the transaction as a whole, may also be included in an HTTP header in the depicted embodiment. The transaction ID may enable the resources implementing the application to determine which transaction each request (or response) is associated with in the depicted embodiment. Constituent services may often implement numerous transactions concurrently, e.g., on behalf of different clients of the distributed application (or even multiple concurrent transactions requested by the same client), so using unique transaction identifiers in the HTTP messages may enable the services to distinguish the traffic associated with the different transactions.

CS 601B, to which the HTTP request 620A was sent, may in turn send HTTP request 620B to a third constituent service CS 601C of the application. HTTP request 620B may include headers 610B and a body 612B. The headers may include the transaction ID 604B and the current retry token count 606B (which is still N in the scenario depicted in FIG. 6. In the event of a failure, error or timeout 651 associated with HTTP request 620B, CS 601B may decrement the retry token count and send the retry HTTP request 620C comprising headers 610C and body 612C. The transaction ID 604C is unchanged in the retried version, but the retry token count 606C is now N-1.

Subsequent HTTP interactions associated with the transaction with ID TXIDI are shown in FIG. 7. In the depicted scenario, CS 601C is able to complete the work request indicated in retried HTTP request 620C, and sends an HTTP response 720A indicating successful completion of the requested work. HTTP response 720A comprises headers 710A and body 712A, with the transaction ID 704A and the current retry token count 706A indicated in the headers.

CS 601B in turn sends HTTP response 720B (corresponding to the HTTP request 620A shown in FIG. 6) to CS 601A, with body 712B and headers 710B indicating the transaction ID 704B and the retry token count 706B. CS 601A then sends an additional HTTP request 721 to another constituent service 601D. The HTTP request 721 may also include the transaction ID 704C and current retry token count 706C on its headers 710C; a body 712C comprising data pertaining to the requested operations may be included in the HTTP request 721 as well. Additional HTTP requests and responses may also be transmitted in various embodiments to complete the transaction. HTTP headers provide a convenient mechanism to convey retry related configuration settings, especially because HTTP is very often used for inter-resource requests for distributed applications, and new header data types can be created to incorporate the retry-related information. In some embodiments in which protocols other than HTTP are used for inter-resource requests and responses, headers of those protocols may be employed for transaction-level retry-related configuration information. Note that the retry management techniques introduced herein may in general be used in any system in which metadata can be communicated between resources participating in distributed transactions (in addition to the data required for the distributed transactions) and are not restricted to any particular communication protocol.

Figure 8:
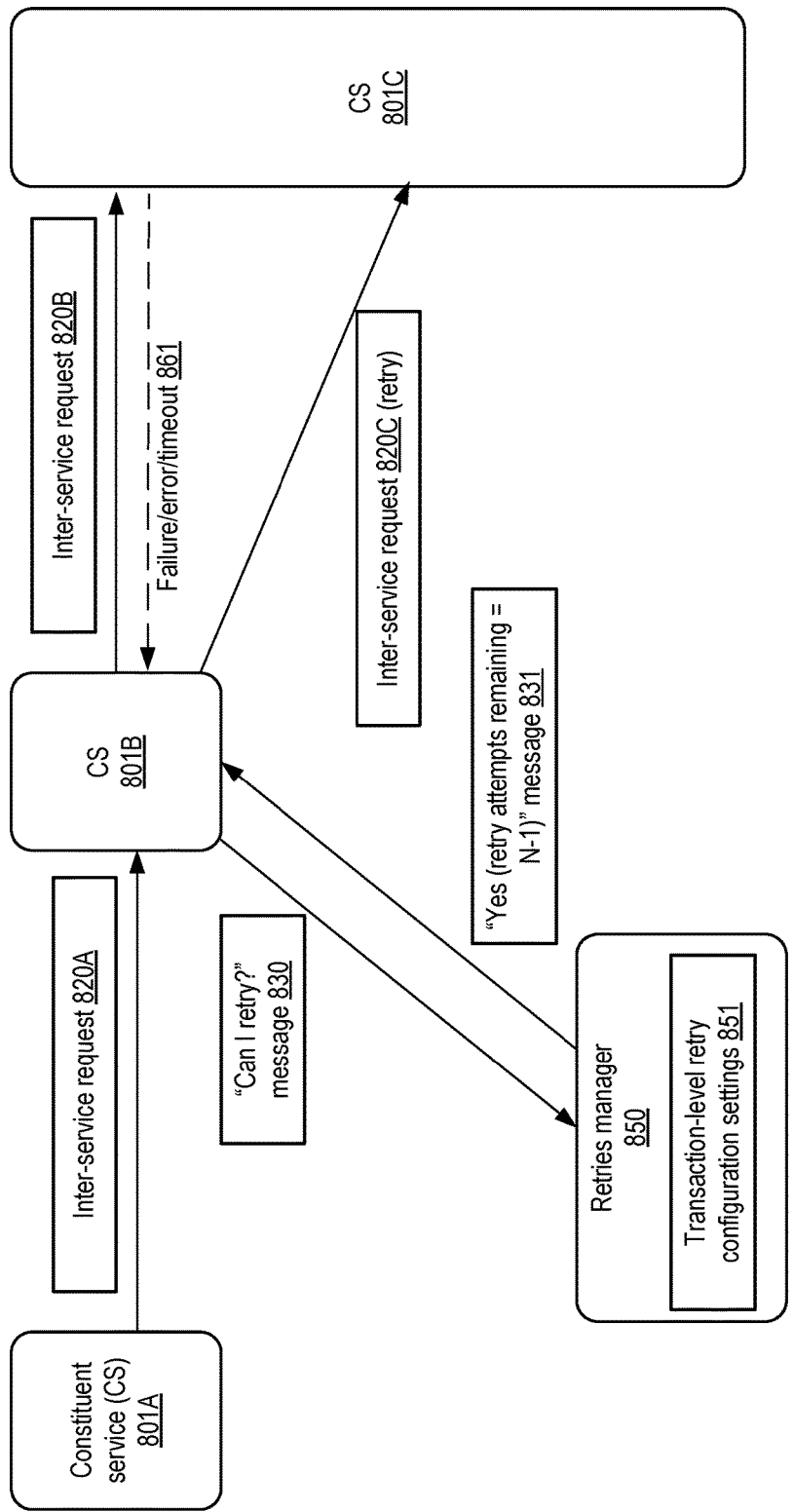
FIG. 8 illustrates an example scenario in which a retries manager external to the constituent services of an application may be employed for conveying information about retry attempts, according to at least some embodiments.

In the scenario depicted in FIG. 6 and FIG. 7, information about the current retry configuration settings (the retry token count) pertaining to a given transaction was transmitted among the resources involved in implementation of the transaction, without involving external entities in retry-related logic. FIG. 8 illustrates an example scenario in which a retries manager external to the constituent services of an application may be employed for conveying information about retry attempts, according to at least some embodiments. In the scenario depicted in FIG. 8, as part of a particular transaction, a constituent service CS 801A of a distributed application has to send an inter-service request 820A to another constituent service CS 801B, and CS 801B has to send another inter-service request 820B to a third constituent service 801C.

CS 801A sends inter-service request 820A to CS 801B. After CS 801B sends its own inter-service request 820B to CS 801C, a failure/error/timeout 861 is detected with respect to the request 820B. CS 801B thus detects that a triggering condition for retrying its inter-service request has been satisfied. Instead of using information contained within the inter-service request 820A to fully determine whether a retry can be attempted, CS 801B sends a "Can I retry?" message 830, e.g., via a network path, to an external retries manager 850 implemented using software and/or hardware of one or more computing devices in the example scenario of FIG. 8. The retries manager may be implemented, for example, as a component of a separate retry authority service or a token authority service in some embodiments.

Retries manager 850 may store, or have access to, a repository of transaction-level retry configuration settings 851 in the depicted embodiment. The message 830 may include an identifier of the transaction being executed using inter-service requests 820A and 820B in some implementations, and this identifier may be used to extract the current retry configuration settings for the transaction. If the current state of the retry configuration settings is such (e.g., if there are tokens available in a bucket corresponding to the transaction), a "Yes (retry attempts remaining=N-1)" message 831 may be sent to CS 801B, and the retry configuration settings of the transaction may be modified (e.g., by consuming a token from the bucket) to reflect the fact that a retry is going to be attempted in the depicted embodiment. If the retry configuration settings prohibit the retry attempt, a message indicating that the retry is not permitted may be sent instead to CS 801B, and the transaction may be designated a failure in some embodiments. Upon receiving the approval for the retry attempt, an inter-service request 820C representing a retry of request 820B may be sent from CS 801B to CS 801C in the depicted example scenario. In one embodiment, the retries manager may utilize cryptographic techniques to ensure that a given token cannot be used more than once: e.g., respective cryptographically-generated strings may be associated with each token that are modified automatically to indicate expiration as soon as the token is assigned for a given retry attempt.

Using an external retries manager 850 (which itself may be implemented as part of a network-accessible service of a cloud computing environment) may present tradeoffs with respect to the constituent-service managed approach illustrated in FIG. 6 and FIG. 7. The external retries manager may represented a trusted entity, whose use prevents the possibility of undesired manipulation of the retry configuration information, for example. In scenarios in which HTTP headers generated by the participant constituent services of a distributed application are used to store the current retry settings, it could be the case that a given constituent service fails to decrement the token count when issuing a retry, e.g., as a result of a bug in the software used at the given constituent service; such errors may be less likely if a retries manager is used, whose sole responsibility is managing retry configuration settings. Furthermore, an external retries manager may also be helpful in scenarios in which the workflow for a given client request comprises several parallel branches. Parallel branches would complicate the use of HTTP messages to keep track of remaining token counts, for example, because constituent services in each branch would have to be kept informed of the token usage in the other branches; use of a centralized retries manager may alleviate this parallelism-related problem. One disadvantage of using the retries manager is that additional latency (associated with messages exchanged with the retries manager by the constituent services) may be introduced into the transactions being executed. Furthermore, it may be the case that some messages intended to be sent to, or received from, the retries manager may themselves be lost due to temporary network congestion or other reasons.

Given these tradeoff considerations, in some embodiments a hybrid approach may be used, in which both an external retries manager as well as HTTP headers may be used for sharing transaction-level retry information. In one such hybrid approach, one or more constituent services may, for example, by default attempt to use a retries manager for some types of API calls; however, if they are unable to communicate quickly enough with the retries manager, they may resort to the use of HTTP headers in a manner similar to that illustrated above. In another hybrid approach, the HTTP headers may be used by default, but the current settings may be transmitted to a retries manager periodically during the course of execution of a given transaction (e.g., after every N seconds, or after every M inter-resource messages). The retries manager may store the received settings in persistent storage, and may also implement an API enabling the constituent services to check or confirm the settings if desired. Other types of hybrid approaches may be used in different embodiments.

Note that approaches to parallel branches in a transaction or workflow graph, other than external retries managers, may be used in some embodiments. For example, a resource from which the parallel branches emerge may be given the responsibility of dividing the remaining tokens between the respective branches. If a resource R1 has a parallel branch leading to resource R2, and another parallel branch leading to resource R3, and R1 has 10 tokens available when it makes its inter-resource requests to R2 and R3, 6 tokens may be provided to R2 by R1 for potential use along R2's branch, and 4 tokens may be provided to R3 by R1 for potential use along R3's branch in one such scenario. When responses are received at R1 from R2 and R3, R1 may sum up the remaining tokens from each branch when providing its own response to an upstream resource (a resource from which a request was received at R1). In the above scenario involving R1, R2 and R3, if 2 tokens were used up in R2's branch and 3 tokens were used up in R3's branch, R1 would be informed by R2 that 4 tokens remain unused out of the 6 provided for R2's branch, and R1 would be informed by R3 that 1 token remains unused from the 4 tokens provided for R3's branch. R1 would then determine the sum of the remaining tokens for both branches and inform an upstream resource (if such an upstream resource exists) that 5 tokens remain for the transaction.

In another variant of the baseline global retry constraint management techniques introduced above, in some embodiments a constituent service may notify a downstream service whether a particular inter-resource request is an original (first-time) request or a retry, and the downstream service may take different actions accordingly. For example, some downstream services may set a shorter deadline to respond (either via a success-indicating message or a failure message) for retries than for first-time requests. If a downstream service S1 is itself under duress (e.g., if it has already had to issue retries to other services S2 or S3), it may reject retry attempts directed to S1 itself in some implementations in such scenarios.

Figure 9:
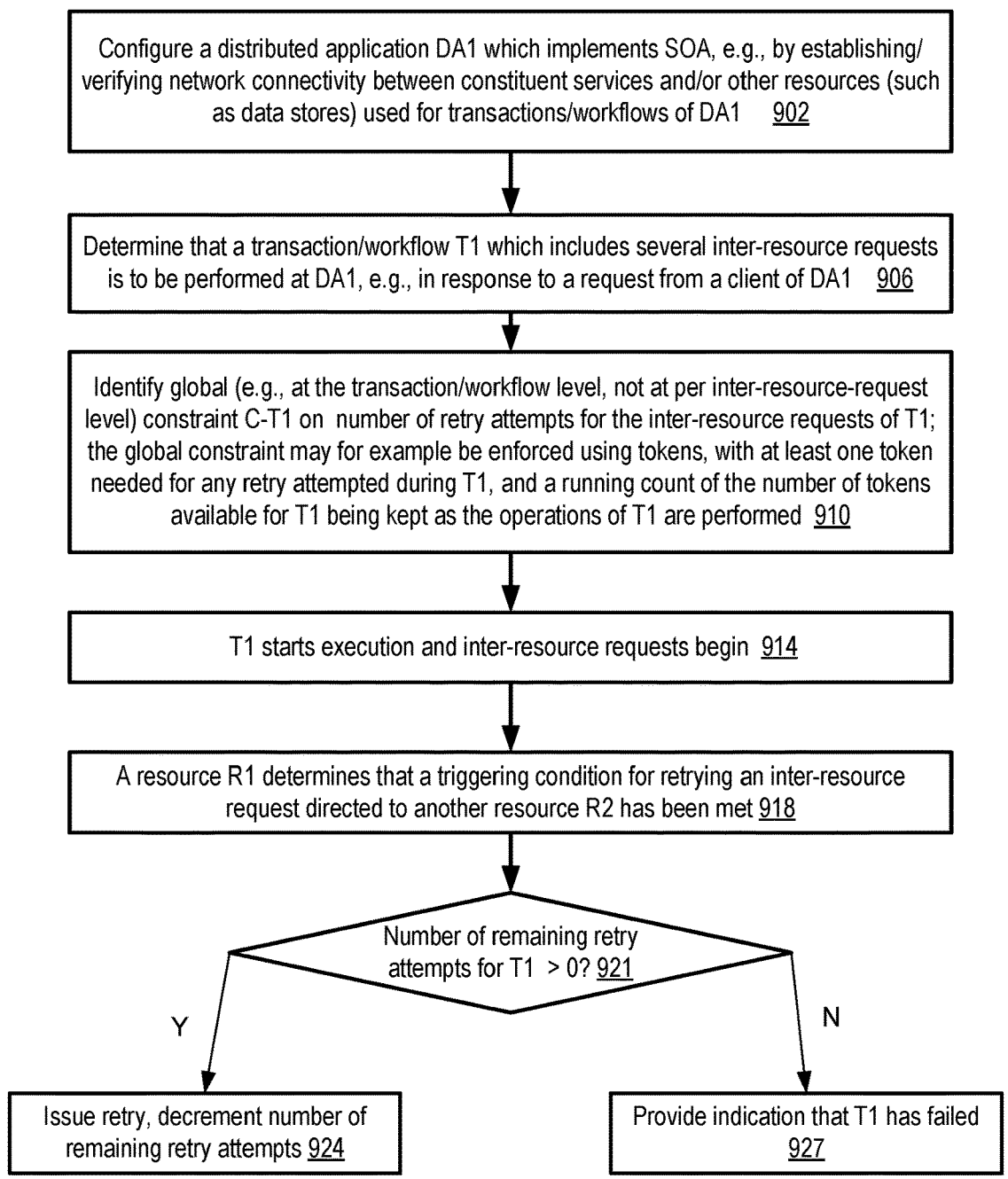
FIG. 9 is a flow diagram illustrating aspects of operations that may be performed to implement system-wide or global constraints on retry attempts at a distributed application, according to at least some embodiments.

FIG. 9 is a flow diagram illustrating aspects of operations that may be performed to implement system-wide or global constraints on retry attempts at a distributed application, according to at least some embodiments. As shown in element 902, a distributed application DA1 which implements a service oriented architecture (SOA) may be configured, e.g., by establishing network connectivity between a plurality of constituent services and/or other resources such as data stores that are to be used collectively to execute various types of transactions or workflows of the application. In some embodiments, the distributed application may itself be exposed as a network-accessible service to which clients may send requests via web services interfaces; in such embodiments, the overall application may be referred to as a macro service while its constituent services may be referred to as micro services.

A determination may be made, e.g., at a request handler or transaction coordinator component of DA1, that a transaction or workflow T1 which includes, or requires obtaining results of, several inter-resource requests is to be performed at DA1 (element 906) in the depicted embodiment. Such a determination may be made, for example, in response to a request received via a programmatic interface from a client of DA1 in some embodiments. At least some of the inter-resource requests may be transmitted (e.g., using API calls, HTTP requests, etc.) via network paths between the hosts at which the constituent services or resources are implemented in some embodiments.

A global constraint C-T1 on the number of retries that can collectively be attempted by the set of resources during the execution of transaction T1 may be determined in various embodiments (element 910). Unlike some conventional approaches in which limits on retries are applied at the per-request level, C-T1 may be enforced at the transaction or workflow level, which may require information about the remaining number of retries that can be attempted for the transaction as a whole to be accessible from at least some of the resources being used for the transaction. In some embodiments, the request handler or transaction coordinator may select C-T1. The constraints may be modeled using token buckets in some implementations. A token bucket may be populated at the beginning of T1 with N tokens, with N being determined based on C-T1, and some number of tokens may be deducted from the bucket every time a retry is attempted. A running count of the number of tokens available for T1 may be maintained as the operations of T1 are performed.

The execution of T1 may be initiated, and transmission of its inter-resource requests may begin (element 914). A particular resource R1 which is utilized for the execution of T1 may determine that a triggering condition for retrying an inter-resource request directed to another resource R2 has been met (element 918) in the depicted embodiment. The trigger for the retry may include, for example, an expiration of a timeout since the inter-resource request was transmitted, the reception of an error/failure message, and so on.

If the number of remaining retry attempts for T1 is greater than zero, as determined in operations corresponding to element 921, the retry may be issued, and the number of remaining retry attempts may be decremented or reduced in the depicted embodiment (element 924). In some implementations, the number of remaining retry attempts may be decremented before the retry is issued; in other implementations, the retry may be issued before the decrement of the number of remaining retry attempts, and in yet other implementations, the retry may be issued at least in part in parallel with an operation to decrement the number. If the number of remaining retry attempts for T1 is not greater than zero, as also determined in operations corresponding to element 921, an indication that T1 has failed may be provided, e.g., to the client at whose request T1 was initiated (element 927) in various embodiments. It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
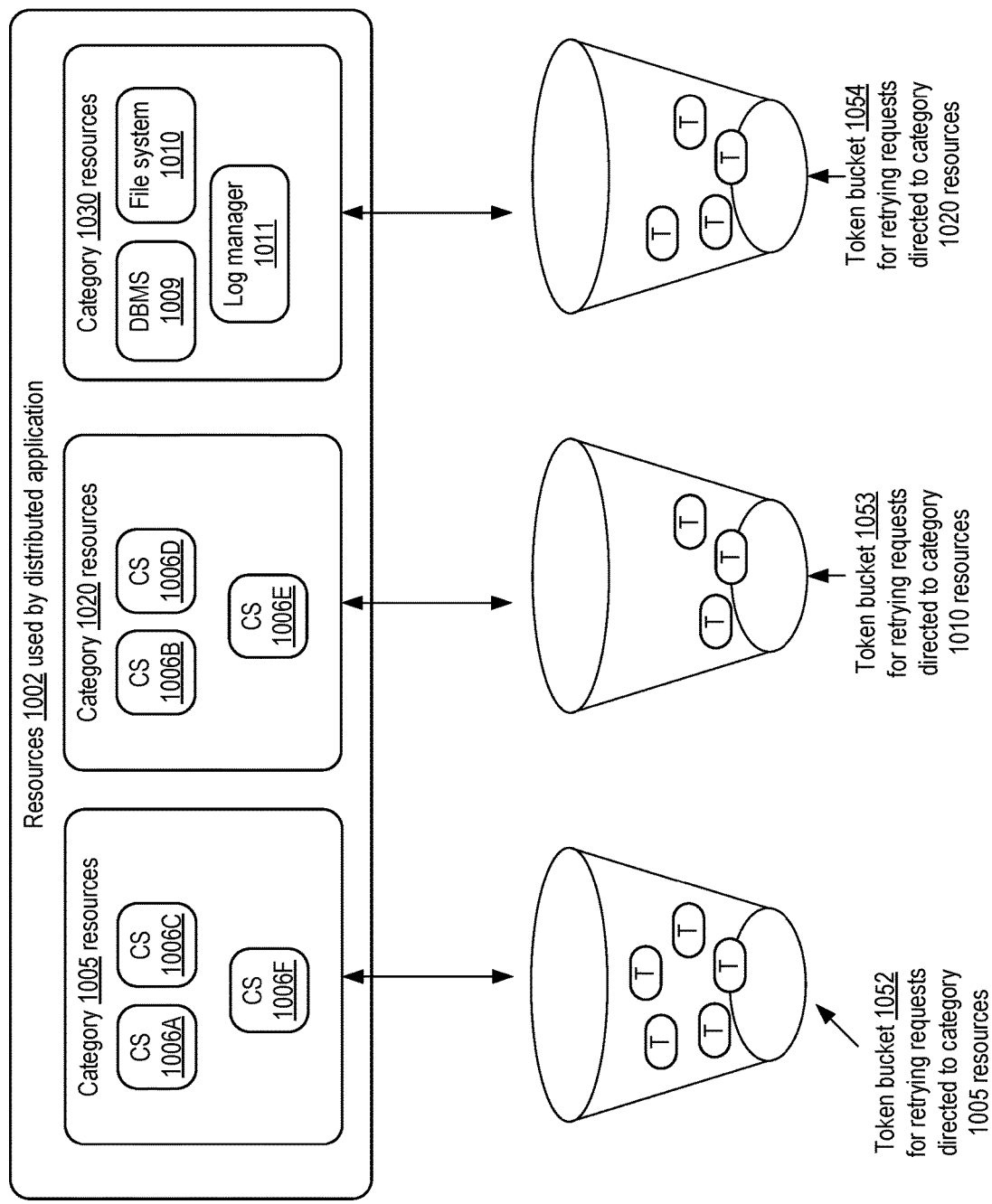
FIG. 10 illustrates an example scenario in which respective token buckets may be utilized for different classes of inter-resource requests of an application, according to at least some embodiments.

In some embodiments, variants of the baseline techniques involving the use of a single token bucket for a given transaction or workflow may be employed. FIG. 10 illustrates an example scenario in which respective token buckets may be utilized for different classes of inter-resource requests of an application, according to at least some embodiments. In the embodiment depicted in FIG. 10, the overall collection of resources 1002 utilized at a distributed application may be divided into classes, e.g., based on the complexity of the tasks performed at the resources, differences in resource costs associated with retries, the likelihood of transient failures at the different resources, and/or other factors. In some cases, the resources may be classified based on assumptions about how critical the timeliness of operations performed at the resources are to the success of the transactions implemented at the distributed application—for example, it may be the case that if an inter-resource request directed to a particular constituent service does not result in a success response message within T seconds, the corresponding transaction should be aborted, while for other constituent services the success message may take 2*T seconds or 3*T seconds without aborting the transaction. Category 1005 resources may include constituent services CS 1006A, CS 1006C and CS 1006F. Category 1020 resources may include constituent services CS 1006B, CS 1006D and CS 1006E, while category 1030 resources may include a database management service (DBMS) 1009, a file system 1010, and a log manager 1011.

Respective token buckets 1052, 1053 and 1054 may be configured for a transaction executed at the distributed application in the embodiment depicted in FIG. 10. Tokens within token bucket 1052 may be consumed for retrying requests directed to category 1005 resources, tokens within token bucket 1053 may be consumed for retrying requests directed to category 1020 resources, and tokens within token bucket 1054 may be consumed for retrying requests directed to category 1030 resources. The number of tokens included in a given bucket at the start of a transaction may be different from the number of tokens included in another bucket in some implementations. If and when a condition for retrying a request directed to a given resource in a particular category is detected, the current number of tokens in the bucket assigned to that category may be examined, and if that bucket is empty, the transaction may be abandoned or failed even if a token bucket assigned to another category is not empty. Note that the resource-class based approach to retry management illustrated in FIG. 10 may be implemented in several different ways—e.g., instead of using separate buckets, separate classes of tokens may be used, or the number of tokens needed for a retry may be set to a different value based on the class of the targeted resource. In one implementation, fractions of tokens may be used instead of whole tokens—e.g., a real number may be used to represent the population of a token bucket rather than an integer, and the population may be reduced by a non-integer value for some classes of resources. In some embodiments, different weights may be assigned to tokens, and some participating resources may be required to consume tokens with different weights than others.

Figure 11:
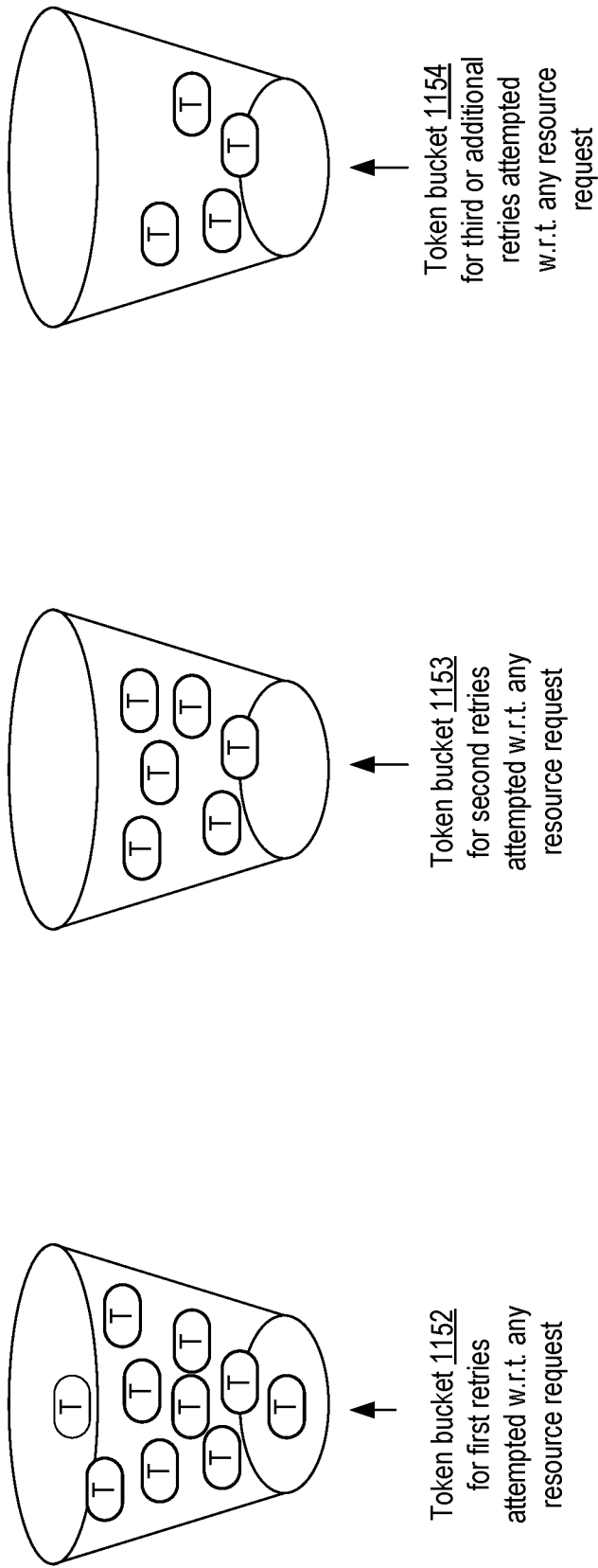
FIG. 11 illustrates an example scenario in which different token buckets may be utilized for a given retry attempt based on the number of earlier retries for the same inter-resource request, according to at least some embodiments.

FIG. 11 illustrates an example scenario in which different token buckets may be utilized for a given retry attempt based on the number of earlier retries for the same inter-resource request, according to at least some embodiments. This approach may be referred to as a retry ordinal based technique. Token bucket 1152 may be used for first retries (the first time that a resource attempts a retry of a particular request), token bucket 1153 may be used for second retries (the second time that a resource attempts a retry, after the original request and the first retry have both failed), while token bucket 1154 may be used for third retries or additional retries beyond third retries. The initial populations of the different buckets 1152, 1153 and 1154 may differ in at least some embodiments.

The retry ordinal based technique may be used in scenarios in which application designers or owners assume that the benefit (and/or cost) associated with successive retries of the same request differs as the number of retries attempted increases. The technique may be better understood using a trivial example. Consider a scenario in which a constituent service CS-A issues an inter-resource request R1 to another constituent service CS-B as part of a transaction T1, and that another constituent service CS-C issues another inter-resource request R2 to a constituent service CS-D as part of T1. If CS-A determines, after its transmission of the original request R1, that a retry should be attempted, CS-A may consume a token from token bucket 1152 (assuming token bucket 1152 is not empty). If the first retry is not successful and a second retry is attempted, CS-A may consume a token from bucket 1153 rather than bucket 1152, and so on. Later, if and when CS-C determines that a first retry of request R1 is warranted, CS-C may consume a token from token bucket 1152 if available, and so on. If the designer of the application wants to make it more likely that $2^{nd}$ or $3^{rd}$ retries result in the failure of transactions than $1^{st}$ retries, more tokens may initially be placed within token bucket 1152 than token bucket 1153 or token bucket 1154 for a given transaction.

Figure 12:
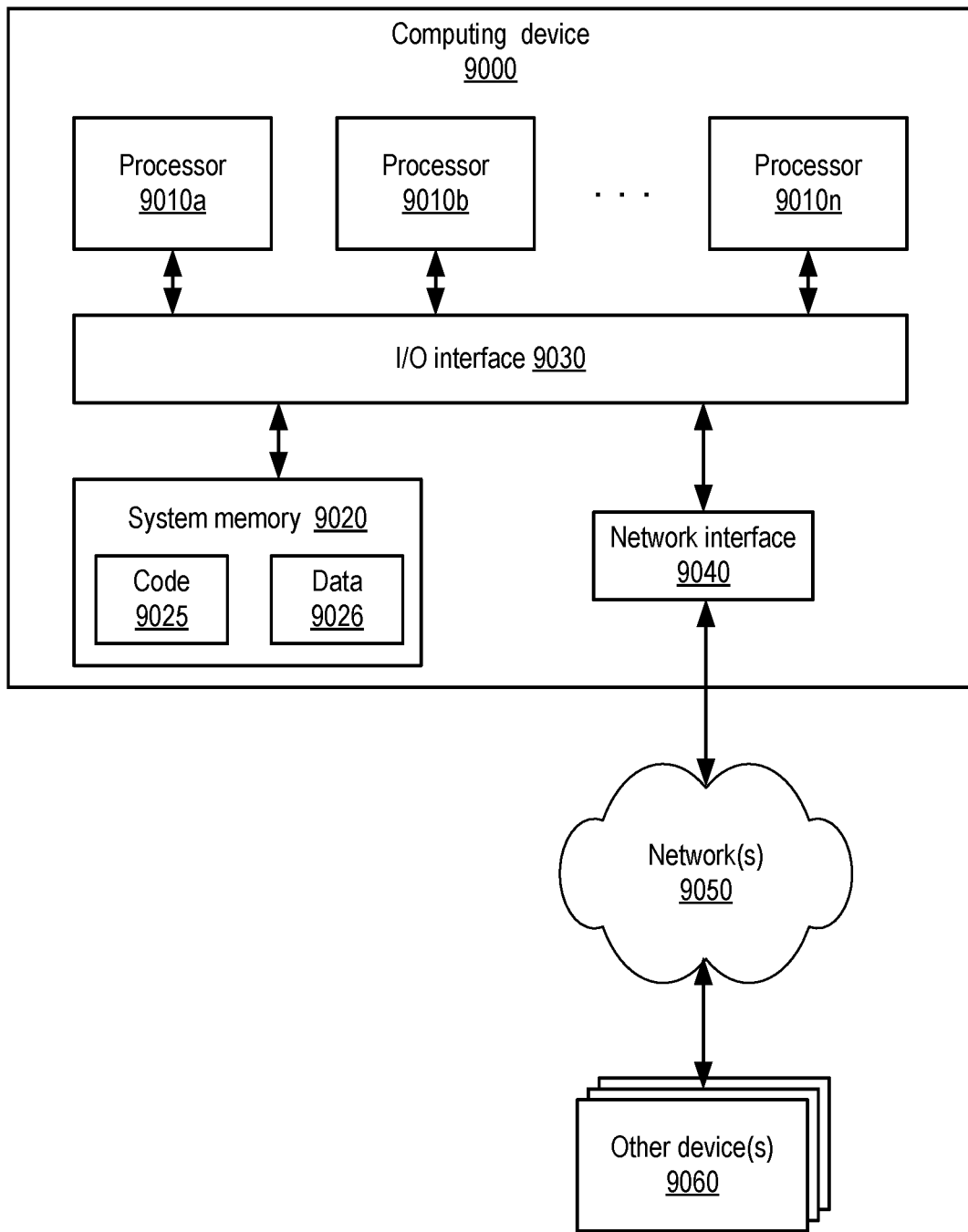
FIG. 12 is a block diagram illustrating an example computing device that may be used in at least some embodiments.

In at least some embodiments, a server that implements the types of techniques described herein (e.g., various functions of constituent services or resources of distributed computing environments such as a cloud provider network), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices;
    wherein the one or more computing devices include instructions that upon execution on or across the one or more computing devices:
        determine that a transaction comprising a plurality of inter-service requests is to be initiated in response to a client request directed to a distributed application implemented using a service-oriented architecture, wherein individual ones of the inter-service requests of the plurality of inter-service requests are to be sent via a network from one constituent service of a plurality of constituent services of the distributed application to another constituent service of the plurality of constituent services, and wherein the plurality of constituent services includes a first constituent service, a second constituent service, and a third constituent service;
        identify a global retry constraint to be applied to the transaction, wherein the global retry constraint indicates an upper limit on a number of retries of inter-service requests that can be attempted to complete the transaction;

cause a population of tokens of a global retry token bucket associated with the transaction to be set to an initial value based at least in part on the upper limit;

in response to a detection, at the first constituent service during execution of the transaction, that (a) a first triggering condition for retrying a first inter-service request directed to the second constituent service from the first constituent service has been satisfied and (b) the population of tokens of the global retry token bucket exceeds a first threshold, cause the first constituent service to:

reduce the population of tokens of the global retry token bucket by a first amount; and retry the first inter-service request; and in response to a detection, at the second constituent service during execution of the transaction, that (a) a second triggering condition for retrying a second inter-service request directed to the third constituent service from the second constituent service has been satisfied and (b) the population of tokens of the global retry token bucket does not exceed the first threshold, cause an indication that the transaction has failed to complete to be generated, without retrying the second inter-service request.

2. The system as recited in claim 1, wherein the one or more computing devices include further instructions that upon execution on or across the one or more computing devices:

transmit an indication of the population of tokens of the global retry token bucket from the first constituent service to the second constituent service via one or more headers of an HTTP (HyperText Transfer Protocol) message utilized for the first inter-service request.

3. The system as recited in claim 1, wherein the one or more computing devices include further instructions that upon execution on or across the one or more computing devices:

cause the first constituent service to reduce the population of tokens of the global retry token bucket by communicating with a retries manager, wherein the retries manager is external to the first constituent service.

4. The system as recited in claim 1, wherein the one or more computing devices include further instructions that upon execution on or across the one or more computing devices:

cause the first constituent service to obtain, via one or more programmatic interfaces, an indication of the global retry constraint.

5. The system as recited in claim 1, wherein the one or more computing devices include further instructions that upon execution on or across the one or more computing devices:

cause the first constituent service to obtain, via one or more programmatic interfaces, a definition of the first triggering condition.

6. A computer-implemented method, comprising:

determining that a workflow comprising a plurality of inter-resource requests of a distributed application is to be initiated, wherein individual ones of the inter-resource requests of the plurality of inter-resource requests are to be directed from one resource of a plurality of resources to another resource of the plurality of resources, and wherein the plurality of resources includes a first resource, a second resource, and a third resource;

in response to detecting, at the first resource during execution of the workflow, that (a) a first triggering condition for retrying a first inter-resource request directed to the second resource from the first resource has been satisfied and (b) a set of retry configuration settings of the workflow indicates that the first resource is permitted to retry the first inter-resource request, wherein the set of retry configuration settings is modifiable by at least some resources of the plurality of resources, wherein the set of retry configuration settings applies globally to the workflow as a unit:

causing, by the first resource, the set of retry configuration settings to be modified to indicate a retry of the first inter-resource request; and retrying, by the first resource, the first inter-resource request; and in response to detecting, at the second resource during execution of the workflow after the retry configuration settings have been modified by the first resource, that (a) a second triggering condition for retrying a second inter-resource request directed to the third resource from the second resource has been satisfied and (b) the set of retry configuration settings indicates that the second resource is not permitted to retry the second inter-resource request, causing an indication that the workflow has failed to be generated, without retrying the second inter-resource request by the second resource.

7. The computer-implemented method as recited in claim 6, further comprising:

transmitting, by the first resource to the second resource, at least a portion of the set of retry configuration settings using one or more headers of an HTTP (HyperText Transfer Protocol) message utilized for the first inter-resource request.

8. The computer-implemented method as recited in claim 6, further comprising:

communicating, by the first resource with a retries manager external to the first resource, to obtain at least a portion of the set of retry configuration settings.

9. The computer-implemented method as recited in claim 6, wherein detecting, by the first resource, that the first triggering condition for retrying the first inter-resource request has been met comprises one or more of: (a) obtaining an error message in response to the first inter-resource request or (b) determining that a timeout associated with the first inter-resource request has expired.

10. The computer-implemented method as recited in claim 6, wherein detecting, by the first resource, that the set of retry configuration settings of the workflow indicates that the first resource is permitted to retry the first inter-resource request comprises:

determining, by the first resource, that a number of retry tokens remaining in the set of retry configuration settings exceeds a threshold.

11. The computer-implemented method as recited in claim 6, wherein causing, by the first resource, the set of retry configuration settings to be modified comprises:

causing, by the first resource, a number of retry tokens indicated in the set of retry configuration settings to be reduced.

12. The computer-implemented method as recited in claim 6, further comprising:

determining, prior to initiating inter-resource requests of the workflow, an upper limit on a number of retries of inter-resource requests that can be attempted during execution of the workflow; and setting an initial number of retry tokens included within the set of retry configuration settings to the upper limit, wherein individual ones of the plurality of resources are not permitted to increase the number of retry tokens during execution of the workflow, and wherein at least some resources of the plurality of resources, including the first resource, are permitted to reduce the count of retry tokens to indicate a retry of an inter-resource request.

13. The computer-implemented method as recited in claim 6, wherein the set of retry configuration settings of the workflow includes a first retry token bucket and a second retry token bucket, wherein detecting that the set of retry configuration settings of the workflow indicates that the first resource is permitted to retry the first inter-resource request comprises:

determining, by the first resource, that a number of retry tokens in the first retry token bucket exceeds a first threshold; and wherein detecting, by the second resource, that the set of retry configuration settings indicates that the second resource is not permitted to retry the second inter-resource request comprises:

determining, by the second resource, that a number of retry tokens remaining in the second retry token bucket is below a second threshold.

14. The computer-implemented method as recited in claim 6, wherein the set of retry configuration settings of the workflow includes a first retry token bucket and a second retry token bucket, wherein detecting that the set of retry configuration settings of the workflow indicates that the first resource is permitted to retry the first inter-resource request comprises:

determining, by the first resource, that a number of retry tokens in the first retry token bucket exceeds a first threshold; and the computer-implemented method further comprising:

detecting, by the first resource, that the retry of the first inter-resource request has failed; and determining, by the first resource, the number of retry tokens in the second retry token bucket to ascertain whether the first resource is permitted to attempt an additional retry of the first inter-resource request.

15. The computer-implemented method as recited in claim 6, further comprising:

transmitting, using at least a portion of the set of retry configuration settings, by the first resource to a fourth resource, an indication of a first number of retries of inter-resource requests which can be attempted in a first parallel branch of the workflow, wherein the first parallel branch of the workflow begins with an inter-resource request sent from the first resource to the fourth resource; and transmitting, using at least another portion of the set of retry configuration settings, by the first resource to a fifth resource, an indication of a second number of retries of inter-resource requests which can be attempted in a second parallel branch of the workflow, wherein the second parallel branch of the workflow begins with an inter-resource request sent from the first resource to the fifth resource.

16. One or more non-transitory computer-accessible storage media storing program instructions that when executed on or across one or more processors:

determine that a workflow comprising a plurality of inter-resource requests of a distributed application is to be initiated, wherein individual ones of the inter-resource requests of the plurality of inter-resource requests are to be directed from one resource of a plurality of resources to another resource of the plurality of resources, and wherein the plurality of resources includes a first resource, a second resource, and a third resource;

in response to detecting, at the first resource during execution of the workflow, that (a) a first triggering condition for retrying a first inter-resource request directed to the second resource from the first resource has been satisfied and (b) a workflow-level retry budget of the workflow indicates that the first resource is permitted to retry the first inter-resource request, wherein the work-level retry budget applies globally to the workflow, wherein the workflow-level retry budget is modifiable by at least some resources of the plurality of resources:

retry, by the first resource, the first inter-resource request; and cause, by the first resource, the workflow-level retry budget to be modified to indicate that the first inter-resource request has been retried; and in response to detecting, at the second resource during execution of the workflow after the workflow-level retry budget has been modified by the first resource, that (a) a second triggering condition for retrying a second inter-resource request directed to the third resource from the second resource has been satisfied and (b) the workflow-level retry budget, which was modified at least by the first resource, indicates that the second resource is not permitted to retry the second inter-resource request, cause an indication that the workflow has failed to be generated, without retrying the second inter-resource request by the second resource.

17. The one or more non-transitory computer-accessible storage media as recited in claim 16, storing further program instructions that when executed on or across one or the more processors:

transmit, by the first resource to the second resource, an indication of the workflow-level retry budget via one or more headers of an HTTP message.

18. The one or more non-transitory computer-accessible storage media as recited in claim 16, storing further program instructions that when executed on or across one or the more processors:

communicate, by the first resource with a retries manager external to the first resource, to obtain an indication of the workflow-level retry budget.

19. The one or more non-transitory computer-accessible storage media as recited in claim 16, storing further program instructions that when executed on or across one or the more processors:

transmit another inter-resource request from the first resource to a fourth resource of the plurality of resources, wherein the other inter-resource request is transmitted prior to transmission of the first inter-resource request to the second resource, and wherein the other inter-resource request comprises an indication of a current version of the workflow-level retry budget as of a time at which the other inter-resource request was transmitted; and obtain, at the first resource from the fourth resource, in a response to the other inter-resource request, an indication that the workflow-level retry budget has been modified due to one or more retries attempted by at least the fourth resource during a set of operations performed to satisfy the other inter-resource request.

20. The one or more non-transitory computer-accessible storage media as recited in claim 16, storing further program instructions that when executed on or across one or the more processors:

provide, via a programmatic interface, one or more retry metrics associated with the workflow, wherein the one or more retry metrics include one or more of (a) a total number of retries attempted during execution of the workflow, (b) a respective count of retries attempted by individual resources of the plurality of resources or (c) statistics on triggering conditions which led to initiation of retries during the workflow.

* * * * *